(12) United States Patent
Nakajima et al.

(10) Patent No.: US 6,176,256 B1
(45) Date of Patent: Jan. 23, 2001

(54) GAS PRESSURE-REDUCING VALVE

(75) Inventors: Yoji Nakajima, Kakuda; Hiroyuki Iwasaki, Urawa; Kazuki Ishikawa; Yoshio Saito, both of Kakuda; Nobuo Arai, Wako; Hiroyuki Goto, Wako; Shuichi Togasawa, Wako, all of (JP)

(73) Assignees: Keihin Corporation; Honda Giken Kogyo Kabushiki Kaisha, both of Tokyo (JP)

(*) Notice: Under 35 U.S.C. 154(b), the term of this patent shall be extended for 0 days.

(21) Appl. No.: 09/274,313

(22) Filed: Mar. 23, 1999

(30) Foreign Application Priority Data

Mar. 24, 1998 (JP) .................................. 10-075211
Mar. 24, 1998 (JP) .................................. 10-075212

(51) Int. Cl.$^7$ .................................................. G05D 16/02
(52) U.S. Cl. ............................... 137/505.12; 137/505.11; 137/505.41; 137/505.42; 137/544
(58) Field of Search ........................... 137/505, 505.41, 137/505.42, 505.12, 505.11, 544

(56) References Cited

U.S. PATENT DOCUMENTS

| | | | |
|---|---|---|---|
| 1,701,185 | * | 2/1929 | Heideman ....................... 137/505.41 |
| 2,057,150 | * | 10/1936 | Kehl et al. ....................... 137/505.12 |
| 3,195,568 | * | 7/1965 | Pearl . | |
| 3,240,223 | * | 3/1966 | Horst . | |
| 3,857,407 | * | 12/1974 | Olson .................................. 137/495 |
| 4,257,450 | * | 3/1981 | Ollivier ......................... 137/505.42 |
| 5,711,340 | * | 1/1998 | Gusky et al. ..................... 137/68.19 |

FOREIGN PATENT DOCUMENTS 3-260483  11/1991 (JP) .
8-334182  12/1996 (JP) .

* cited by examiner

*Primary Examiner*—Stephen M. Hepperle
(74) *Attorney, Agent, or Firm*—Arent Fox Kintner Plotkin & Kahn

(57) ABSTRACT

A gas pressure-reducing valve in which a valve member to be seated on a valve seat having a valve hole opened at its central portion and leading to a pressure-reducing chamber between a body and a diaphragm is fixed on a valve stem connected to the central portion of the diaphragm and arranged coaxially with the valve axis. A bottomed mounting bore which is aligned with the valve axis and opened toward the pressure-reducing chamber is formed in the body. A cylindrical valve seat member forming a valve chamber between itself and the closed end of the mounting bore for accommodating the valve member and inserted into the mounting bore is fixed on the body. A valve seat facing the valve chamber is formed on the inner surface of the end portion of the valve seat member on the side of the pressure-reducing chamber. This arrangement makes it possible to reduce the number of parts and to enhance the degree of freedom for the arrangement of the parts in the body.

13 Claims, 14 Drawing Sheets

GAS PRESSURE-REDUCING VALVE

BACKGROUND OF THE INVENTION

1. Field of the Invention

The present invention relates to a gas pressure-reducing valve and, more particularly, to a gas pressure-reducing valve in which a valve member to be seated on a valve seat having a valve hole opened at its central portion and leading to a pressure-reducing chamber between a body and a diaphragm is fixed on a valve stem connected to the central portion of the diaphragm and is disposed coaxially with the valve axis.

2. Related Art

Such a gas pressure-reducing valve has already been known in the prior art from Japanese Patent Application Laid-open Nos. 3-260483 and 8-334182 and the like.

In the gas pressure-reducing valve disclosed in the above Japanese Patent Application Laid-open No. 3-260483, a valve seat is formed on the inner end of an accommodation bore that is formed in a body for accommodating a valve member, and a cover member for sealing the outer end of the accommodation bore is mounted on the body. Not only the number of parts is large, but also a cover and the mentioned cover member have to be attached to both sides of the body, and hence the degree of freedom for arranging the gas pressure-reducing valve in the body is narrowed.

In the gas pressure-reducing valve disclosed in Japanese Patent Application Laid-open No. 8-334182, on the other hand, a valve body to be screwed in a mounting bore formed in a body is constructed to have a valve seat and to accommodate a valve member. This construction is also troubled like Japanese Patent Application Laid-open No. 3-260483 by the increased number of parts and the narrowed degree of freedom for arranging the gas pressure-reducing valve in the body.

SUMMARY OF THE INVENTION

The invention has been accomplished in view of the background thus far described and has an object to provide a gas pressure-reducing valve which is reduced in the number of parts and enhanced in the degree of freedom for arrangement in the body.

In order to achieve the above-specified object, according to a first feature of the invention, there is provided a gas pressure-reducing valve comprising a diaphragm clamped at a peripheral edge portion thereof between a body and cover fastened to the body for constructing a valve housing together with the body, the diaphragm is spring-urged toward a side which reduces the capacity of a pressure-reducing chamber formed between the diaphragm and the body, in which a valve member that can be seated on a valve seat having at a central portion thereof with a opened valve hole leading to the pressure-reducing chamber is fixed on a valve stem connected to the central portion of the diaphragm and arranged coaxially with the valve hole, wherein a bottomed mounting bore arranged coaxially with the valve stem and opened toward the pressure-reducing chamber is provided in the body, wherein a cylindrical valve seat member forming a valve chamber between itself and a closed end of the mounting bore for accommodating the valve member and inserted into the mounting bore is fixed on the body, and wherein the valve seat facing the valve chamber is formed on an inner surface of an end portion of the valve seat member on the side of the pressure-reducing chamber.

With the above arrangement of the first feature, the valve seat member having the valve seat is inserted and fixed in the bottomed mounting bore which is formed in the body and opened toward the pressure-reducing chamber and the valve member is accommodated in the valve chamber formed between the valve seat member and the body. This arrangement makes it unnecessary for the members such as the cover member to be mounted and accordingly makes it possible to reduce the number of parts and to increase the degree of freedom for arranging the gas pressure-reducing valve in the body. Further, the valve seat is formed on the inner surface of the end portion of the valve seat member on the side of the pressure-reducing chamber so that the valve member can be arranged as close to the pressure-reducing chamber as possible thereby to make a contribution to the size reduction of the body.

In addition to the above first feature, according to a second feature of the invention, wherein one end portion of the valve stem is borne on the body so as to be movable in the axial direction thereof, a plurality of guide portions for coming into sliding contact with the inner surface of the valve seat member at a plurality of circumferentially spaced portions are provided on the outer surf ace of the valve member made of a synthetic resin, and wherein a passage extending in the axial direction of the valve stem is formed between the guide portions and between the valve member and the valve seat member.

With the above arrangement of the second feature, the valve stem is borne axially movably by the body at its one-end portion and through the valve member and the valve seat member by the body at its portion in which the valve member is fixed. Even if the transverse load by the spring which urges the diaphragm toward the pressure-reducing chamber acts on the valve stem or if the diaphragm is misaligned when its peripheral edge portion is to be clamped between the body and the cover, the valve stem can be prevented from falling down to align the valve seat and the valve member accurately, so that the valve member can be reliably seated on the valve seat along its entire periphery. Moreover, the sliding resistance, which is caused when the respective guide portions provided on the valve member of a synthetic resin come into sliding contact with the inner face of the valve seat member, is generated against the vibration of the spring for urging the diaphragm toward the pressure-reducing chamber, so that the establishment of the self-excited vibration can be prevented to the minimum.

In addition to the above first feature, according to a third feature of the invention, an internal thread for fastening the valve seat member is formed in the inner surface of the mounting bore, and a plurality of projections for forming therebetween a plurality of grooves extending radially of the valve stem in a plane normal to the axis of the valve stem are protruded from an end surface of the valve seat member on the side of the pressure-reducing chamber.

With the above arrangement of the third feature, a tool can be applied to the groove between the respective projections to turn the valve seat members so that the valve seat member can be easily mounted on the body. Moreover, the deflection of the diaphragm in the direction for the valve member to be moved apart from the valve seat can be regulated by the respective projections, and the communication of the gas between the valve chamber and the pressure-reducing chamber is allowed through the respective grooves even with the diaphragm abutting against the respective projections.

In addition to the above first feature, according to a fourth feature of the invention, on one of the valve housing and a reciprocating member slidably fitted in the valve housing so as to reciprocate in the axial direction of the valve hole in accordance with deflections of the diaphragm, a plurality of ring members are mounted to come into elastically sliding contact with the other of the reciprocating member and the valve housings so that the ring members are spaced from each other in the axial direction of the reciprocating member, and a space defined between the ring members and between the reciprocating member and the valve housing is filled with grease.

With the above arrangement of the fourth feature, the ring members, as mounted on one of the reciprocating member and the valve housing, are brought into elastically sliding contact with the other of the reciprocating member and the valve housing so that the sliding resistance against the self-excited vibration by the coil spring can be achieved. Since the space between the individual ring members and between the reciprocating member and the valve housing is filled with grease, moreover, the outflow of the grease can be avoided to the least even after a long operation thereby to suppress the wear of the respective ring members. Even if the individual ring members are blotted with the oil content, since the sliding resistance should have been set considering the grease in the initial state, no drop in the sliding resistance could be invited. Since the necessary sliding resistance is achieved by the ring members, furthermore, the respective ring members are not large-sized even if the compressibility is set considering the permanent strain of the respective ring members so as to achieve proper sliding resistance, so that the degree of freedom for the arrangement of the ring members can be enhanced.

In addition to the above fourth feature according to a fifth aspect of the invention, a piston as the reciprocating member is slidably fitted in the covers so as to be movable within a restricted range in the axial direction of the valve hole and is connected to the central portion of the diaphragm.

Here, the diaphragms are subjected to the spring force so as to reduce the capacity of the pressure-reducing chamber by the coil spring having a relatively high spring force. When the coil spring falls down, however, the deflecting direction of the diaphragm, that is, the acting direction of the valve member may deviate to make the seating of the valve member on the valve seats incomplete thereby to cause a deterioration in the pressure regulation. With the above arrangement of the fifth feature, however, the reciprocating member is slidably fitted in the cover and can be given the aligning function to align the deflecting direction of the diaphragm with the axis of the valve hole, so that the valve member can be reliably seated on the valve seat to prevent the deterioration in the pressure regulation.

In addition to the above fifth feature, according to a sixth aspect of the invention, a communication bore is formed in the piston having a cylindrical shape so as to extend over inner and outer surface of the piston. With the arrangement of the sixth feature, it is possible to prevent the pressure on the back side of the diaphragms from undesirably rising or lowering in response to the reciprocations of the diaphragms and the pistons.

In addition to the above fourth feature, according to a seventh feature of the invention, curved chamfered portions are formed on outer surfaces of axial opposite ends of the reciprocating member. With the above arrangement of the seventh feature, the paired ring members can be respectively mounted easily on the reciprocating member from the axial opposite end sides of the member while avoiding their damages.

In addition to the above fourth feature, according to an eighth feature of the invention, the reciprocating member is slidably fitted in a sliding bore formed in the valve housing from one end side of the sliding bore, and a chamfered portion is formed on an opening at the one end side of the sliding bore. With the arrangement of the eighth feature, the ring members can be prevented from being damaged, when the reciprocating member carrying them is to be fitted in the sliding bore.

The foregoing and other objects, features and advantages of the invention will become apparent from the following detailed description on its preferred embodiment with reference to the accompanying drawings.

BRIEF DESCRIPTION OF THE DRAWINGS

FIGS. 1 to 15 show one embodiment of the present invention in which:

FIG. 1 is a schematic diagram showing an arrangement of a fuel supply system of a vehicle;

FIG. 2 is a side view of a regulator;

FIG. 3 is a top plan view of the regulator;

FIG. 4 is a sectional view taken along a line 4—4 in FIG. 3;

FIG. 5 is a sectional view taken along a line 5—5 in FIG. 4;

FIG. 6 is an enlarged longitudinal sectional view of an electromagnetic cut-off valve;

FIG. 7 is a diagram illustrating the suction characteristics of the electromagnetic cut-off valve;

FIG. 8 is an enlarged longitudinal sectional view of a primary pressure-reducing valve;

FIG. 9 is an enlarged sectional view taken along a line 9—9 in FIG. 8;

FIG. 10 is an enlarged view of an essential portion of FIG. 8;

FIG. 11 is a diagram showing the pressure reducing characteristics of the primary pressure-reducing valve in accordance with the ambient temperature;

FIG. 12 is a diagram showing the hysteresis characteristics depending upon the number of O-rings to be fitted on a piston;

FIG. 13 is an enlarged longitudinal sectional view of a secondary pressure-reducing valve;

FIG. 14 is a sectional view taken along a line 14—14 in FIG. 13; and FIG. 15 is a longitudinally sectional side view taken along a line 15—15 in FIG. 14 but with only the cap being cut.

DESCRIPTION OF THE PREFERRED EMBODIMENT

Figure 1:
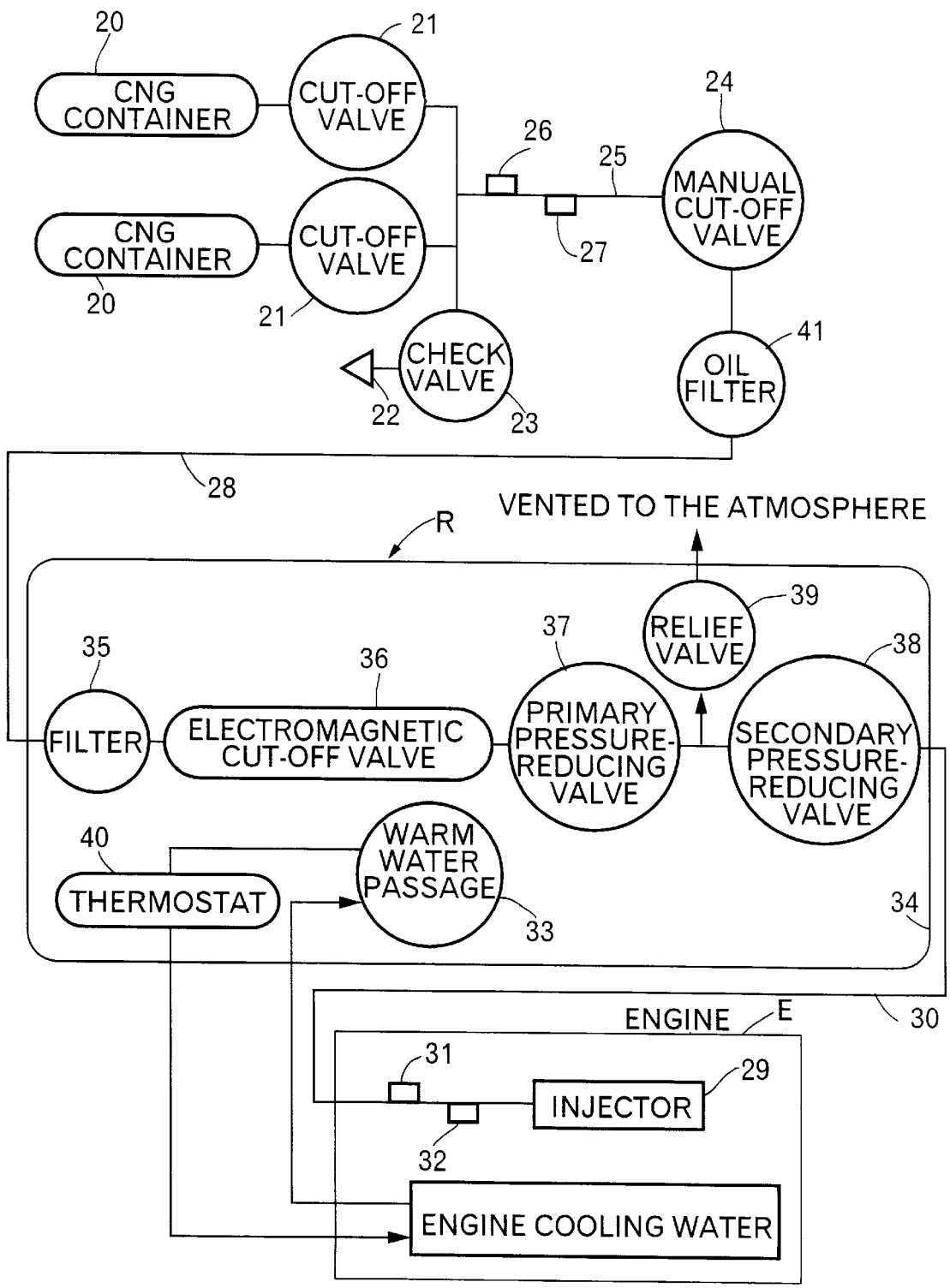
Figure 2:
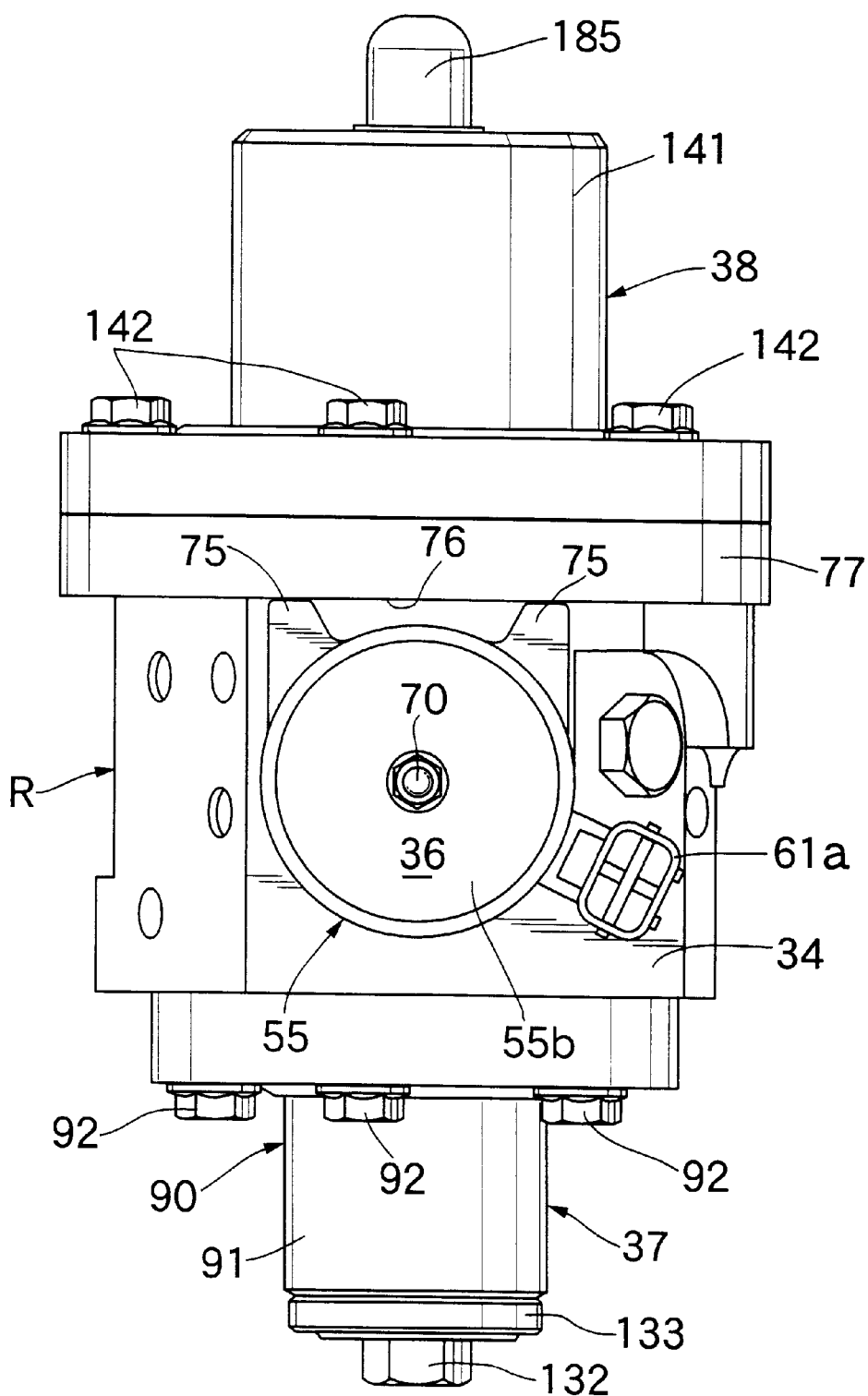
Figure 3:
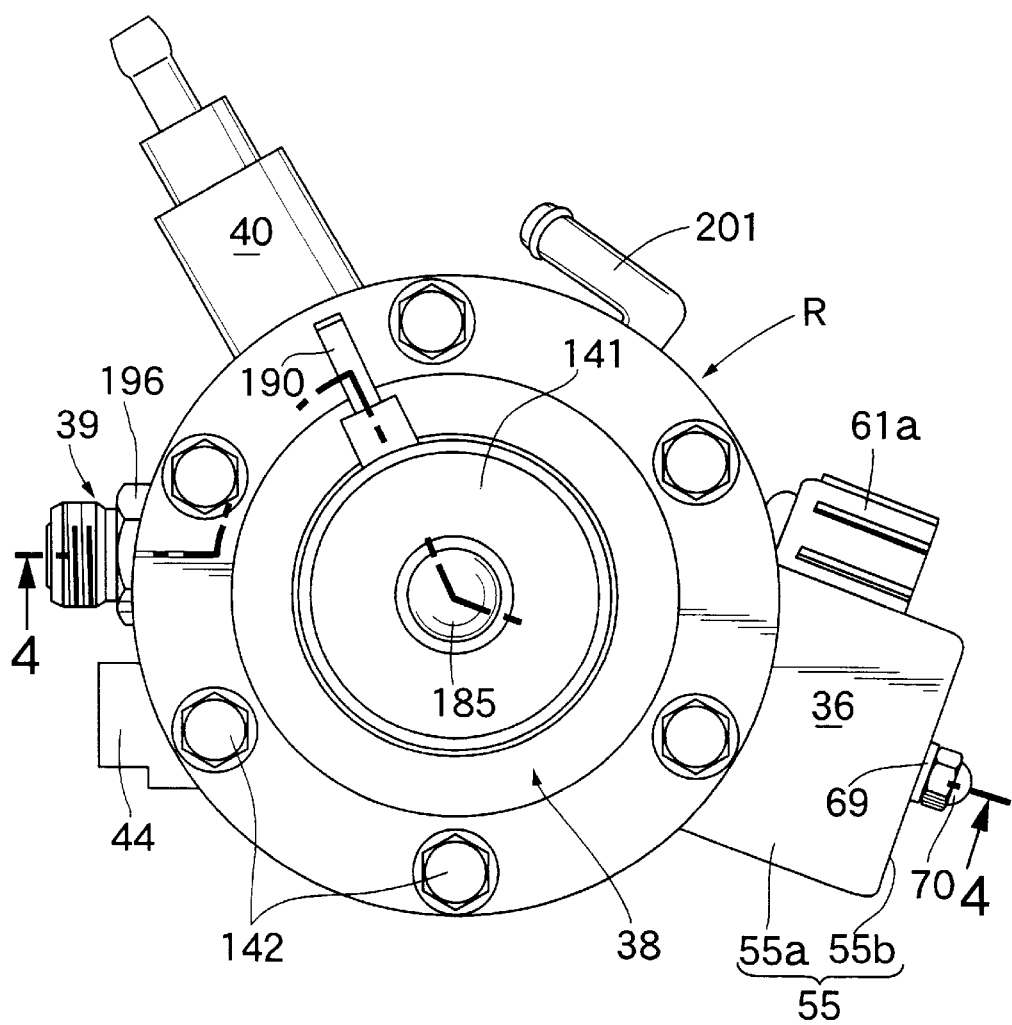

One embodiment of the invention will be described with reference to FIGS. 1 to 15. First of all, as shown in FIG. 1, the compressed natural gas (hereinafter referred to as "CNG") is reserved under pressures such as 250 to 10 Kg/cm$^2$ in one or more CNG tanks or containers 20. These CNG containers 20 are individually provided with container cut-off valves 21 which are commonly connected with a charge port 22 through a check valve 23 and further with a manual cut-off valve 24. A passage 25 between the individual container cut-off valves 21 and the manual cut-off valve 24 is provided with a pressure sensor 26 and a temperature sensor 27.

When the container cut-off valves 21 and the manual cut-off valve 24 are to be opened, the CNG from the CNG containers 20 is introduced into a regulator R via a conduit 28, which is provided with an oil filter 41 for filtering off such oil as might otherwise immigrate at the time of charging the CNG containers 20 with the CNG by a compressor. The CNG, as regulated to 2 to 3 Kg/cm$^2$ by the regulator R, is further introduced into the injector 29 of an engine E via a conduit 30. This conduit 30 is provided with a temperature sensor 31 and a pressure sensor 32.

With additional reference to FIGS. 2 to 5, the regulator R is comprised of a filter 35, an electromagnetic cut-off valve 36, a primary pressure-reducing valve 37, a secondary pressure-reducing valve 38, a relief valve 39 and a thermostat 40, which are arranged in their common body 34 having a warm water passage 33.

The filter 35 filters out the impurity which is contained in the CNG introduced via the conduit 28 leading from the manual cut-off valve 24. The electromagnetic cut-off valve 36 acts to cut off the communication between the filter 35 and the primary pressure-reducing valve 37 in response to the stop of an operation of the engine E thereby to stop the supply of the CNG.

The primary pressure-reducing valve 37, for example, acts to reduce the CNG having a high pressure such as 250 to 10 Kg/cm$^2$ coming from the CNG containers 20, to 6 to 7 Kg/cm$^2$. The secondary pressure-reducing valve 38 for example acts to reduce the CNG coming from the primary pressure-reducing valve 37, to 2 to 3 Kg/cm$^2$. The CNG from the secondary pressure-reducing valve 38 is introduced via the conduit 30 into the injector 29.

The relief valve 39 is connected between the primary pressure-reducing valve 37 and the secondary pressure-reducing valve 38, and is opened to release the CNG, which has been pressure-reduced by the primary pressure-reducing valve 37 and introduced into the secondary pressure-reducing valve 38, to the atmosphere when the pressure of the CNG rises to exceed a preset valve opening level such as 16.5 Kg/cm$^2$.

Into the warm water passage 33 of the body 34, moreover, there is introduced the engine cooling water from the engine E so that the temperature of the body 34 may not become excessively low in accordance with the pressure-reducing actions of the primary and secondary pressure-reducing valves 37 and 38. The thermostat 40 is arranged in the body 34 on the return side of the engine cooling water from the warm water passage 33 to the engine E, and acts to close, when the engine cooling water to flow to the warm water passage 33 exceeds 80 degrees, for example, thereby to prevent the temperature of the body 34 from rising to a higher level.

Here will be sequentially described the arrangements and operations of the filter 35, the electromagnetic cut-off valve 36, the primary pressure-reducing valve 37, the secondary pressure-reducing valve 38, the relief valve 39 and the thermostat 40.

Filter 35

Figure 5:
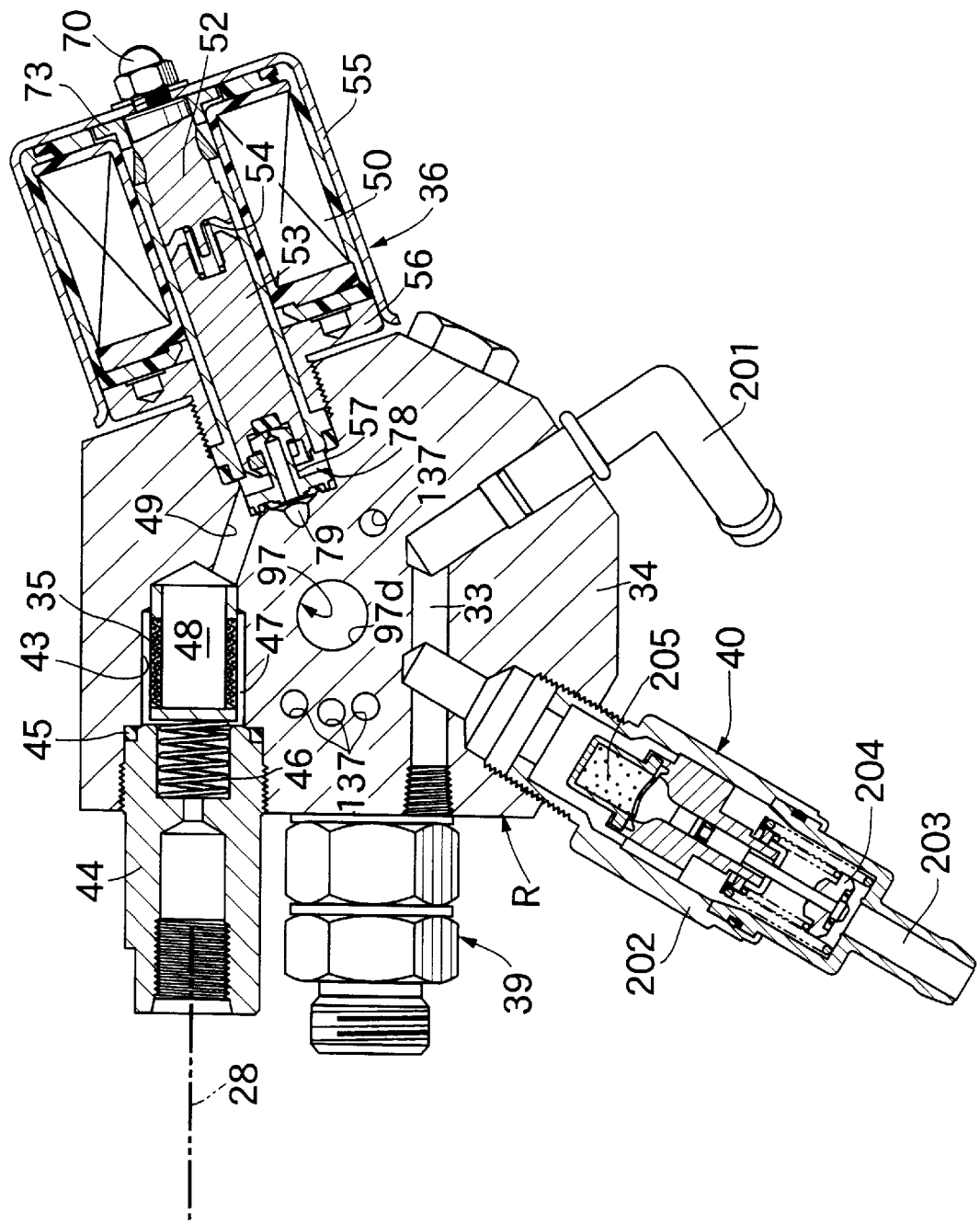

With especial reference to FIG. 5, a recess 43 is formed in the side portion of the vertically intermediate portion of the body 34. A tube fitting 44 is so fastened in the outer end opening of the recess 43 as to clamp an annular seal member 45 between its inner end and the body 34. The conduit 28 for introducing the CNG from the manual cut-off valve 24 is connected to the outer end portion of the tube fitting 44. The filter 35 is fitted in the recess 43 at a clearance from the inner end of the tube fitting 44. Between the filter 35 and the tube fitting 44, there is interposed a spring 46 for generating an elastic force to urge the filter 35 to the inner end closed portion of the recess 43.

Between the outer circumference of the filter 35 fitted in the recess 43 and the body 34, there is formed an annular unpurification chamber 47 which is communicating with the inside of the tube fitting 44. The body 34 is provided with a passage 49 which communicates with a purification chamber 48 in the filter 35. Thus, the CNG which contains the impurity is introduced via the conduit 28, flows from the unpurification chamber 47 through the filter 35, at which the impurity is removed into the purification chamber 48 and further into the passage 49.

Electromagnetic Cut-off Valve

Figure 6:
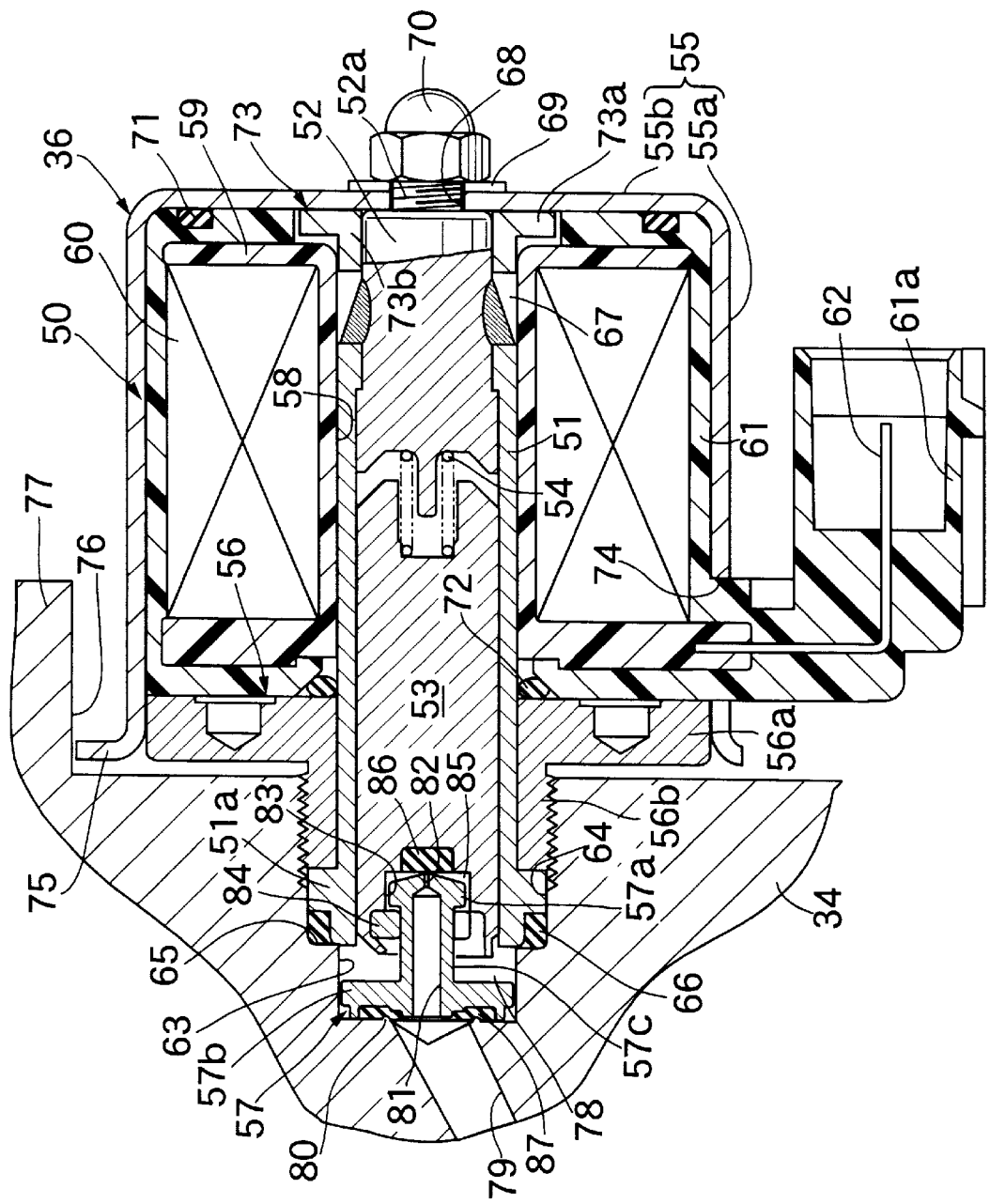

With additional reference to FIG. 6, the electromagnetic cut-off valve 36 is mounted on the side portion of the body 34 at a position circumferentially spaced from the fastened position of the tube fitting 44 and at a vertical position corresponding to the filter 35.

This electromagnetic cut-off valve 36 is comprised of a coil assembly 50, a guide cylinder 51 made of a non-magnetic material and having one end side inserted into the coil assembly 50 and the other end side fixed on the body 34, a stationary core 52 fixed in the guide cylinder 51 so as to close one end of the guide cylinder 51, a plunger 53 slidably fitted in the guide cylinder 51 opposed to the stationary core 52, a return spring 54 interposed between the stationary core 52 and the plunger 53, a solenoid housing 55 made of a magnetic metal and fastened on the stationary core 52 so as to cover the coil assembly 50, a magnetic support frame 56 fastened in the body 34 so as to interpose the coil assembly 50 between itself and the solenoid housing 55, and a valve member 57 held on the plunger 53 on the side opposed to the stationary core 52.

The coil assembly 50 is constructed by coating a bobbin 59 made of a synthetic resin and having a center bore 58 and a coil 60 to be wound on the bobbin 59, with a coating portion 61 of a synthetic resin. The coating portion 61 is integrally provided at its portion on the side of the body 34 with a coupler portion 61a outwardly projecting a pair of connection terminals 62 leading to the coil 60. This coupler portion 61a is connected with the not-shown lead wire.

The body 34 is provided with a smaller diameter bore 63 having a closed inner end and a larger diameter bore 64 having a larger diameter than that of the smaller diameter bore 63 and coaxially leading to the outer end of the smaller diameter bore 63, so as to form an annular stepped portion 65 facing the outside between the two bores. On the outer face of the other end side of the guide cylinder 51 to be inserted at its one end side into the center bore 58 of the bobbin 59, there is integrally provided with a flanged portion 51a which faces the inner face of the larger diameter bore 64 at its outer circumference such that it projects radially outward. The other end portion of the guide cylinder 51 is so inserted into the larger diameter bore 64 as to interpose an annular seal member 66 between the flanged portion 51a and the stepped portion 65.

The magnetic support frame 56 includes a ring plate portion 56a enclosing the portion of the guide cylinder 51, as protruded from the coil assembly 50 to the body 34, and abutting against the end face of the coil assembly 50 on the side of the body 34 and a cylindrical portion 56b integrally leading from the inner circumference of the ring plate portion 56a and enclosing the guide cylinder 51. The magnetic support frame 56 is assembled with the body 34 by screwing the cylindrical portion 56b into the larger diameter bore 64. Moreover, the seal member 66 and the flanged portion 51a are clamped between the stepped portion 65 and the top end of the cylindrical portion 56b so that the guide cylinder 51 is fixed in the body 34.

The stationary core 52 is formed of a magnetic metal into a rod shape having a circular transverse section and is fixed in the guide cylinder 51 by the welding method or the like so that its outer end is protruded from one end of the guide cylinder 51 whereas its inner end is fitted in one end portion of the guide cylinder 51. At this time, the radially projecting flanged portion 51a is disposed on the other end side of the guide cylinder 51 so that the mounting of the magnetic support frame 56 and the coil assembly 50 on the guide cylinder 51 has to be carried out from the one end side of the guide cylinder 51, i.e., from the side of the stationary core 52. In order that the fixed portion of the guide cylinder 51 and the stationary core 52 may not protrude from the outer face of the guide cylinder 51, the external diameter of the portion of the stationary core 52 protruding from the guide cylinder 51 is set smaller than that of the guide cylinder 51. As a result, an annular clearance 67 is formed between the one end side inner face of the center bore 58 in the coil assembly 50 and the outer circumference of the stationary core 52. On the other hand, the outer end face of the stationary core 52 is arranged at the substantially same position as that of the one end face of the coil assembly 50 along an axis of the guide cylinder 51.

The solenoid housing 55 is formed into a bottomed cylindrical shape which is integrally provided with a cylindrical portion 55a enclosing the coil assembly 50 and an end plate portion 55b extended from one end portion of the cylindrical portion 55a. The central portion of the end plate portion 55b is in abutment against the outer end face of the stationary core 52. From the stationary core 52, moreover, there is coaxially and integrally extended a threaded stem portion 52a projecting outward from the outer end face of the stationary core 52. At the center of the end plate portion 55b, an insert hole 68 for inserting the threaded stem portion 52a is provided. Thus, a cap nut 70 is screwed on the protrusion of the threaded stem portion 52a from the end plate portion 55b while sandwiching a washer 69 between the cap nut 70 and the outer face of the end plate portion 55b. When this cap nut 70 is fastened, the end plate portion 55b, i.e., the central portion of the closed end of the solenoid housing 55 is fastened to the stationary core 52.

By thus fastening the solenoid housing 55 on the stationary core 52, the coil assembly 50 is clamped between the end plate portion 55b of the solenoid housing 55 and the ring plate portion 56a of the magnetic support frame 56. In order to prevent an excessive load from acting on the coil assembly 50 by fastening the solenoid housing 55, an annular elastic member 71 for elastically contacting with the inner face of the end plate portion 55b is mounted on one end face of the coil assembly 50, and an annular elastic member 72 is interposed between the inner circumference of the other end portion of the coil assembly 50 and the elastic support frame 56.

On the inner face of the end plate portion 55b of the solenoid housing 55, a magnetic path forming member 73 which is made of a magnetic metal is fixed by a spot-welding method or the like. This magnetic path forming member 73 includes a ring plate portion 73a enclosing the stationary core 52 and abutting against the inner face of the end plate portion 55b, and a cylindrical portion 73b extending coaxially and integrally at its one end from the inner circumference of the ring plate portion 73a. The cylindrical portion 73b encloses the stationary core 52 while being magnetically coupled to the stationary core 52, the other end portion of the cylindrical portion 73b is inserted into the annular clearance 67 which is formed between the coil assembly 50 and the stationary core 52.

In the other end side of the cylindrical portion 55a of the solenoid housing 55, there is formed a notch 74 for protruding the coupler portion 61a which is integrally provided with the coating portion 61 of the coil assembly 50 to the outside. Over the electromagnetic cut-off valve 36, the body 34 is integrally provided with a disk-shaped flanged portion 77 for mounting the secondary pressure-reducing valve 38, which protrudes outwardly. The face of this flanged portion 77 on the side of the electromagnetic cut-off valve 36 provides a flat regulation wall 76 opposed to the other end side of the cylindrical portion 55a of the solenoid housing 55 of the electromagnetic cut-off valve 36. On the other hand, the cylindrical portion 55a is provided at its other end with a pair of engagement pawls 75 and 75 protruding toward the regulation wall 76. When these engagement pawls 75 and 75 come into engagement with the regulation wall 76, the solenoid housing 55 is prevented from turning on the axis of the threaded stem portion 52a of the stationary core 52.

Here, the guide cylinder 51 is fixed in the body 34 with its other end side being inserted in the larger diameter bore 64, and the plunger 53 is slidably fitted in the guide cylinder 51. As a result, a main valve chamber 78 is formed between the closed inner end portion of the smaller diameter bore 63 of the body 34, and the other ends of the guide cylinder 51 and the plunger 53. Moreover, the passage 49 leading to the purification chamber 48 of the filter 35 communicates with the main valve chamber 78 so that the CNG which is purified with the filter 35, is introduced into the main valve chamber 78.

On the other hand, the body 34 is provided with a passage 79 to be opened at the center in the closed inner end portion of the smaller diameter bore 63. In the body 34, there is further provided an annular valve seat 80 which is slightly protruded toward the main valve chamber 78 so as to enclose the open end of that passage 79 into the main valve chamber 78.

The valve member 57 is constructed by integrating a one end side pilot valve portion 57a, which is formed into a disk shape having on its one end face a taper face converging toward the plunger 53, and an other end side main valve portion 57b, which is formed into a disk shape opposed to the closed inner end portion of the smaller diameter bore 63, through a connecting cylindrical portion 57c forming a step between the two valve portions 57a and 57b. The diameter of the pilot valve portion 57a is set smaller than that of the main valve portion 57b. The central portion of this valve member 57 is coaxially provided with a first passage 81 communicating with the passage 79 at all times, and a second passage 82 opened into the central portion of the one end face of the pilot valve portion 57a via the first passage 81. The second passage 82 is formed to have a smaller diameter than that of the first passage 81.

The end portion of the plunger 53 facing the main valve chamber 78 is provided with a recess 83 for receiving the pilot valve portion 57a. This pilot valve portion 57a is loosely inserted into the recess 83 so that it is prevented from coming out of the recess 83 by a C-shaped stop ring 84 fixed on the other end of the plunger 53. A pilot valve chamber 85 is formed between the pilot valve portion 57a and the plunger 53 to communicate with the main valve chamber 78. In the central portion of the closed end of the recess 83, a rubber seal 86 is embedded, for sealing the opening of the second passage 82 into the pilot valve chamber 85 when it seats the central portion of the one end face of the pilot valve portion 57a. Thus, the stop ring 84 is fixed on the plunger 53 at such a position where the pilot valve portion 57a can axially move relative to the plunger 53 between the closed end of the recess 83 and the stop ring 84.

In the face of the main valve portion 57b opposed to the closed end of the smaller diameter bore 63, an annular rubber seal 87 is embedded, which is seated on the valve seat 80 to shut the communication between the main valve chamber 78 and the passage 79.

In the electromagnetic cut-off valve 36 thus constructed, at a stop of the engine E, with the coil 60 being demagnetized, the plunger 53 is moved apart from the stationary core 52 by the action of the return spring 54, then the rubber seal 87 of the main valve portion 57b is seated on the valve seat 80 to shut the communication between the main valve chamber 78 and the passage 79, and the pilot valve portion 57a is seated on the rubber seal 86 to shut the communication between the pilot valve chamber 85 and the passage 79. As a result, the supply of the CNG at a high pressure to the passage 79 is stopped.

On the other hand, when the coil 60 is magnetized at the time of starting the engine E, the plunger 53 at first moves to such a stroke toward the stationary core 52 as to bring the pilot valve portion 57a away from the rubber seal 86, so that the second passage 82 communicating with the passage 79 via the first passage 81 establishes communication with the pilot valve chamber 85. As a result, the CNG gradually flows from the main valve chamber 78 via the pilot valve chamber 85, the second passage 82 and the first passage 81 into the passage 79 thereby to reduce the difference between the pressures acting on the main valve portion 57b from the sides of the main valve chamber 78 and the passage 79. When the electromagnetic force by the coil 60 overcomes the pressure difference acting on the main valve portion 57b, the plunger 53 farther moves toward the stationary core 52, and the rubber seal 87 of the main valve portion 57b leaves the valve seat 80 so that the CNG flows from the main valve chamber 78 to the passage 79.

In the electromagnetic cut-off valve 36, moreover, the central portion of the end plate portion 55b of the solenoid housing 55 is fastened to the stationary core 52, but the engagement pawls 75 and 75, integrally provided with the cylindrical portion 55a of the solenoid housing 55, come into engagement with the regulation wall 76 of the body 34. As a result, the solenoid housing 55 is prevented from turning on the fastened portion of its end plate portion 55b to the stationary core 52 by the engagement of the pawls 75 and 75 with the regulation wall 76. Thus, the turn of the solenoid housing 55 can be prevented by the simple structure in which it is unnecessary to increase the strength of fastening the solenoid housing 55 to the stationary core 52. The circumference of the coupler portion 61a, as protruded to the outside from the notch 74 disposed in the cylindrical portion 55a of the solenoid housing 55, can also be prevented from going out of position so that no undesired external force is applied to the lead wire connected to the coupler portion 61a. Moreover, the regulation wall 76 is a surface of such a disk-shaped flanged portion 77 on the side of the electromagnetic cut-off valve 36 as to mount the secondary pressure-reducing valve 38 on the body 34. Thus, the regulation wall 76 need not be especially formed, but the solenoid housing 55 can be arranged as close to the center of the body 34 as possible thereby contributes to a size reduction of the regulator R.

On the other hand, the annular clearance 67 is formed between the outer face of the stationary core 52 and the inner face of the center bore 58 of the coil assembly 50. The magnetic path forming member 73, which is provided with the ring plate portion 73a abutting against the closed end of the solenoid housing 55, i.e., the inner face of the end plate portion 55b, and the cylindrical portion 73b disposed coaxially and integrally at its one end from the inner circumference of the ring plate portion 73a and enclosing the stationary core 52 in the magnetically coupling manner, is fixed in the solenoid housing 55 so that the other end portion of the cylindrical portion 73b is inserted into the clearance 67. The magnetic path forming member 73 is arranged between the solenoid housing 55 and the stationary core 52 so that the area of the magnetic path between solenoid housing 55 and the stationary core 52 results in such a relatively large value or the sum of the area corresponding to the outer end face of the stationary core 52 and the area of the outer circumference of the stationary core 52 at the portion to be enclosed by the cylindrical portion 73b of the magnetic path forming member 73. Thus, the magnetic path area between the solenoid housing 55 and the stationary core 52 can be sufficiently enlarged.

Figure 7:
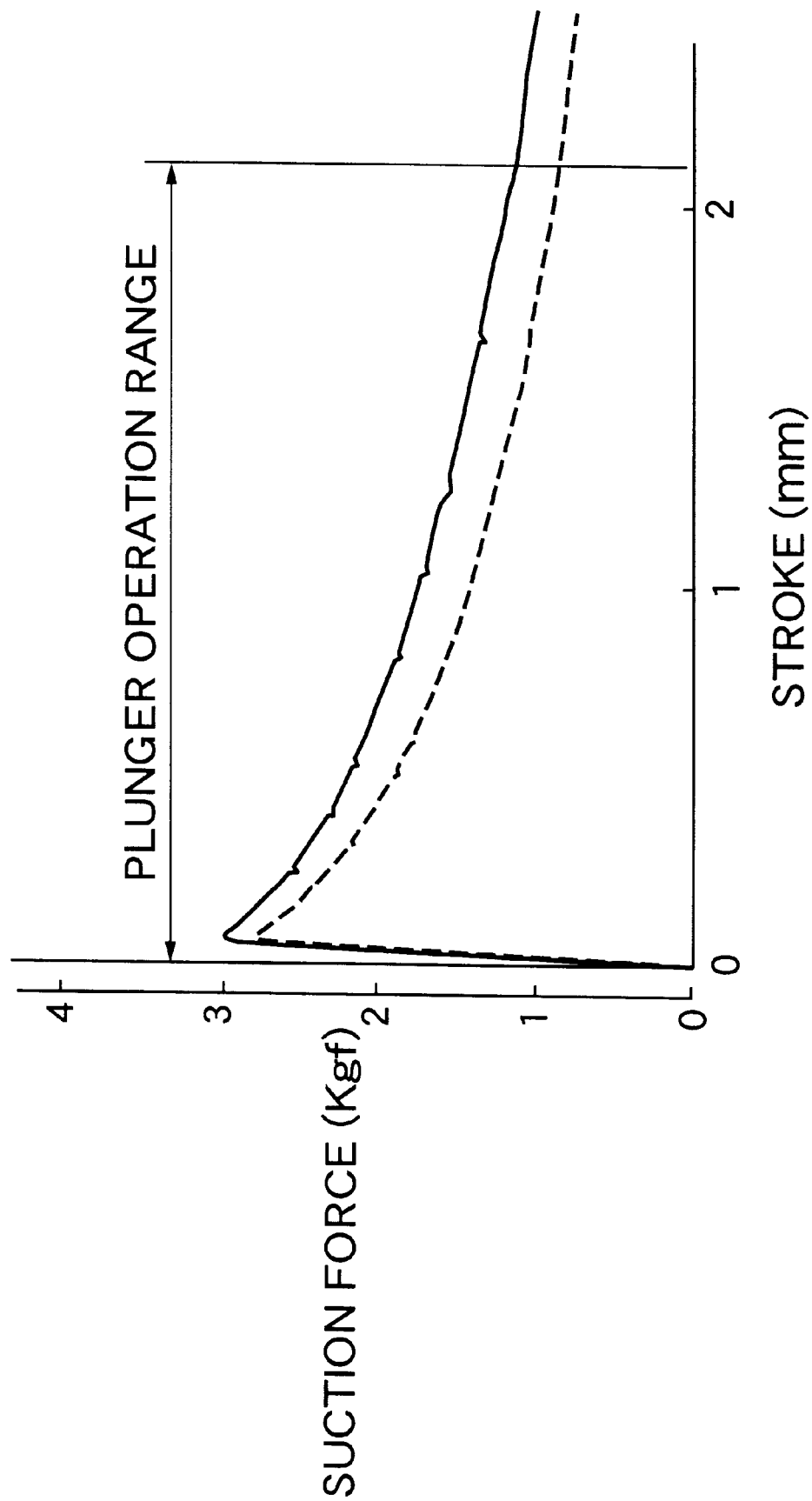

As a result, the structure having only the annular clearance 67 exhibits the suction characteristics, as illustrated by a broken curve in FIG. 7, but the structure having the magnetic path forming member 73 inserted into the clearance 67 can provide the excellent suction characteristics, as illustrated by a solid curve in FIG. 7.

Primary Pressure-Reducing Valve 37

Figure 8:
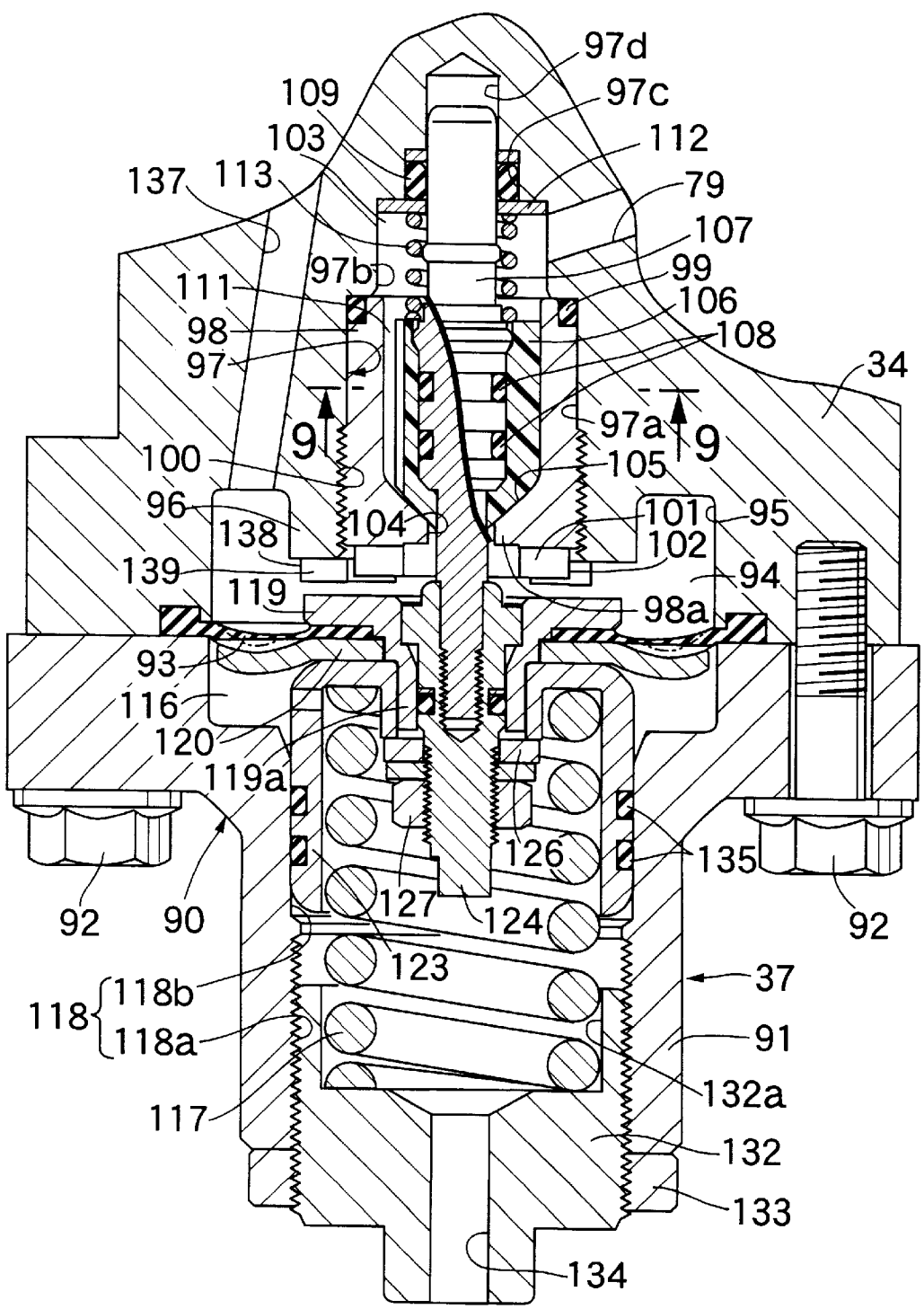

In FIG. 8, a valve housing 90 of the primary pressure-reducing valve 37 is constructed of the lower portion of the body 34 and a cover 91 fastened to the lower face of the body 34 by means of a plurality of bolts 92. A diaphragm 93 is clamped at its circumferential edge portion between the lower face of the body 34 and the cover 91.

A recess 95 is formed in the lower face of the body 34, which forms a pressure-reducing chamber 94 between itself and the diaphragm 93. On the central portion at the closed end of the recess 95, there is formed a round rising portion 96 protruding toward the diaphragm 93.

In the body 34, a bottomed mounting bore 97 is vertically disposed, which is opened at its lower end toward the pressure-reducing chamber 94 and closed at its upper end. This mounting bore 97 is comprised of a first bore portion 97a opened at its lower end into the center portion of the lower end of the rising portion 96, a second bore portion 97b made smaller diameter than the first bore portion 97a and coaxially leading at its lower end to the upper end of the first bore portion 97a, a third bore portion 97c made smaller diameter than the second bore portion 97b and coaxially leading at its lower end to the upper end of the second bore portion 97b, and a fourth bore portion 97d made smaller diameter than the third bore portion 97c and coaxially leading at its lower end to the upper end of the third bore portion 97c while its upper end being closed. The passage 79 for guiding the CNG from the electromagnetic cut-off valve 36 is opened in the inner face of the second bore portion 97b.

A cylindrical valve seat member 98 is screwed in the first bore portion 97a of the mounting bore 97 so that an annular seal member 99 is clamped between the valve seat member 98 and the stepped portion between the first and second bore portions 97a and 97b. Specifically, in the inner face of the lower portion of the first bore portion 97a of the mounting bore 97, there is formed an internal thread 100, in which the valve seat member 98 is screwed.

On the end face of the valve seat member 98 on the side of the pressure-reducing chamber 94, moreover, a plurality of, e.g., four ridges 102 are protrudingly disposed, which form a plurality of, e.g., four grooves 101 extending radially of the valve seat member 98 in a plane normal to the axis of the mounting bore 97. These grooves 101 are arranged in the shape of a cross. When the valve seat member 98 is screwed in the internal thread 100, the not-shown tool can be applied to the cross-shaped grooves 101 to turn the valve seat member 98 so that the valve seat member 98 can be easily mounted on the body 34.

A valve chamber 103 communicating with the passage 79 is formed between the valve seat member 98 and the closed portion of the upper end of the mounting bore 97. On the other hand, the valve seat member 98 is integrally provided at its end portion on the side of the pressure-reducing chamber 94 with an inward flange 98a extending radially inward. In the inner circumference of this inward flange 98a, there is formed a valve hole 104 communicating with the pressure-reducing chamber 94. On the inner face of the inward flange 98a, there is formed a taper valve seat 105 which confronts the valve chamber 103 while opening the valve hole 104 in the central portion.

Figure 9:
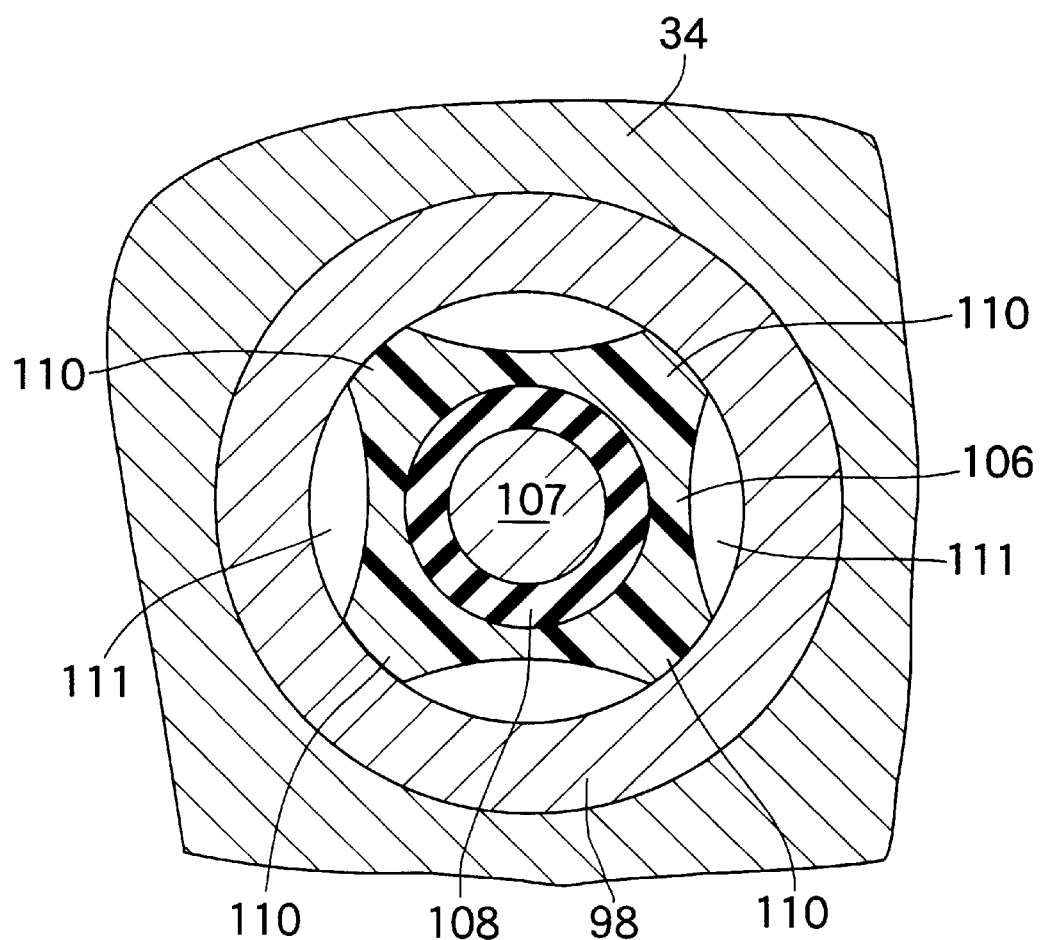

With additional reference to FIG. 9, a valve member 106 made of a synthetic resin is accommodated in the valve chamber 103, which can be seated on the valve seat 105. This valve member 106 is fixed on a valve stem 107 which is arranged coaxially with the valve hole 104.

The valve member 106 is formed into a cylindrical shape by tapering its one end face opposed to the taper valve seat 105 so that it may be seated on the valve seat 105. The valve member 106 is fixed on the valve stem 107 by fitting the valve stem 107 elastically in the valve member 106. On the outer face of the valve stem 107 at axially spaced positions, moreover, there are mounted a pair of O-rings 108 and 108 which elastically contact with the inner face of the valve member 106.

The valve stem 107 is borne at its one end portion in the body 34 so that it is allowed to move axially by a bearing 109 interposed between the valve stem 107 and the inner face of the third bore portion 97c of the mounting bore 97. On the outer face of the valve member 106, on the other hand, there are formed a plurality of, e.g., four guide portions 110 which are equally spaced in the circumferential direction and brought into sliding contact with the inner face of the valve seat member 98. Between the respective guide portions 110 and between the valve member 106 and the valve seat member 98, communication passages 111 are formed, which extend in the axial direction of the valve stem 107.

A retainer 112 for retaining the bearing 109 between itself and the stepped portion between the third and fourth bore portions 97c and 97d of the mounting bore 97 is in abutment against the stepped portion between the second and third bore portions 97b and 97c. A spring 113 is interposed under compression between the retainer 112 and the valve member 106.

Between the cover 91 and the diaphragm 93, there is formed a spring chamber 116, in which a coil spring 117 for urging the diaphragm 93 toward the pressure-reducing chamber 94 is accommodated.

The cover 91 is provided with an accommodation bore 118 which extends coaxially with the valve hole 104 and which is opened at its outer end. This accommodation bore 118 is comprised of a threaded bore portion 118a on the axially outer side, and a sliding bore portion 118b on the axially inner side, which is made larger diameter than the threaded bore portion 118a and coaxially leading to the threaded bore portion 118a. Moreover, the internal diameter of the accommodating bore 118 is set to such a value as to enable to put in and out the coil spring 117.

Figure 10:
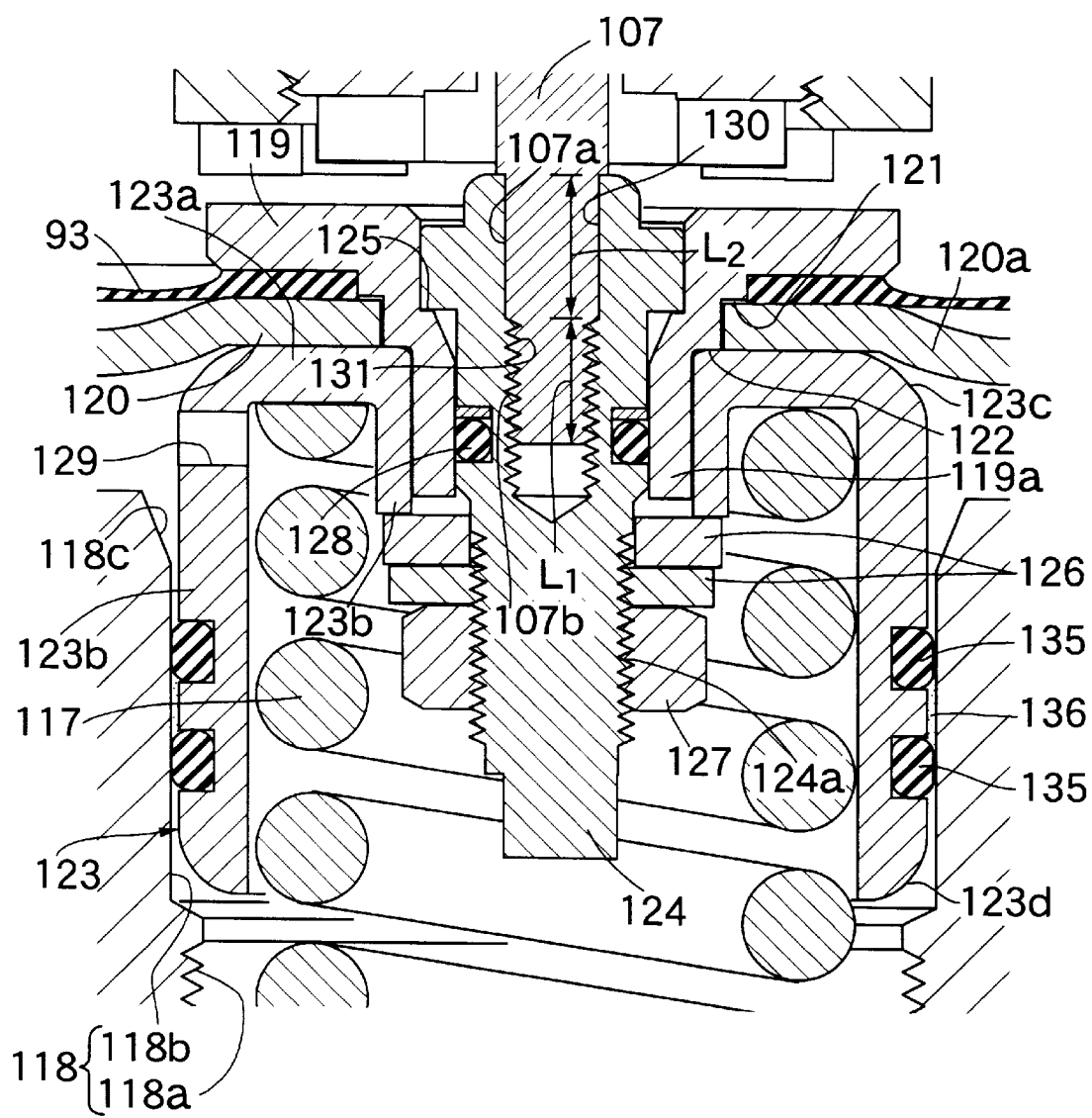
Figure 11:
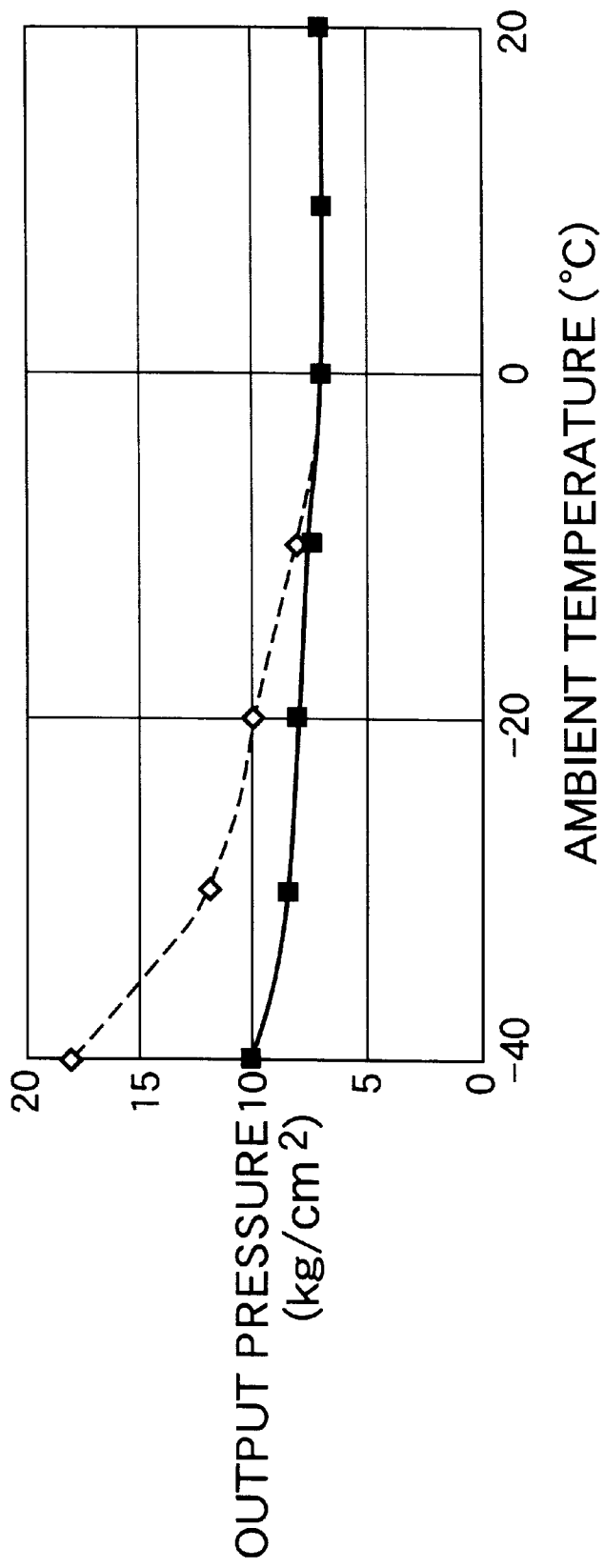
Figure 12:
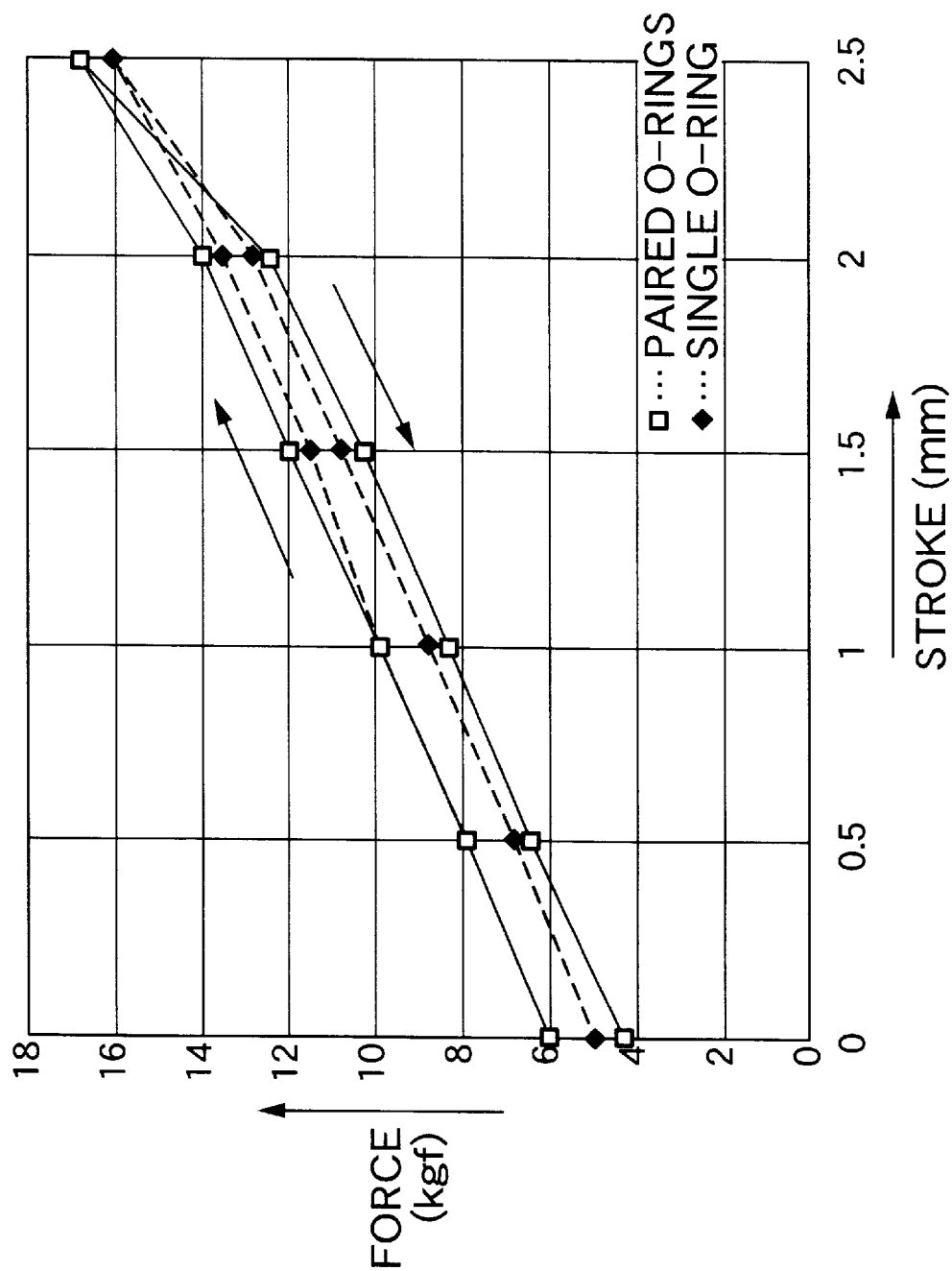

With additional reference to FIG. 10, against the surface of the central portion of the diaphragm 93, facing the pressure-reducing chamber 94, a first diaphragm retainer 119 abuts, which is integrally provided with a cylindrical portion 119a protruding through the center portion of the diaphragm 93 toward the spring chamber 116. Against the surface of the central portion of the diaphragm 93, facing the spring chamber 116, a second diaphragm retainer 120 abuts, which engages at its inner circumference with an annular stepped portion 121 formed on the outer face of the cylindrical portion 119a, to clamp the central portion of the diaphragm 93 between the first and second diaphragm retainers 119 and 120.

In the sliding bore portion 118b of the accommodation bore 118, on the other hand, a piston 123 having a cylindrical shape is fitted acting as a reciprocating member so that it can slide axially within a restricted range. In short, the accommodation bore 118 also has a function as a sliding bore for fitting the piston 123 slidably.

The piston 123 is provided at its end portion on the side of the diaphragm 93 with an abutment plate portion 123a, which has a ring plate shape to abut against both an annular stepped portion 122 formed on the outer surface of the cylindrical portion 119a and the second diaphragm retainer 120, and a cylindrical portion 123b leading to the inner circumference of the abutment plate portion 123a to enclose the cylindrical portion 119a. Moreover, the top end of the cylindrical portion 123b of the piston 123 is positioned outside of the top end of the cylindrical portion 119a of the first diaphragm retainer 119.

A diaphragm rod 124 is inserted from the side of the pressure-reducing chamber 94 into the central portion of the first diaphragm retainer 119. An annular stepped portion 125 facing the pressure-reducing chamber 94 is formed on the inner face of the cylindrical portion 119a of the first diaphragm retainer 119. The diaphragm rod 124 engages with the annular stepped portion 125. On the protrusion from the cylindrical portion 119a, i.e., on the diaphragm rod 124, a threaded stem portion 124a is provided. A nut 127 is screwed on the threaded stem portion 124a while interposing washers 126 between the nut 127 and the top end of the cylindrical portion 123b. By fastening the nut 127, the central portion of the diaphragm 93 is clamped between the two diaphragm retainers 119 and 120, and the diaphragm rod 124 is fixed at the central portion of the diaphragm 93, so that the piston 123 is jointed to the central portion of the diaphragm 93. In order to seal up the pressure-reducing chamber 94 and the spring chamber 116, moreover, an annular seal member 128, as mounted on the outer circumference of the diaphragm rod 124, contacts elastically with the inner face of the cylindrical portion 119a.

The other end portion of the valve stem 107, i.e. , the end portion on the side of the diaphragm 93 is coaxially fastened to the diaphragm rod 124. This diaphragm rod 124 is provided with a fitting bore 130 opened at its one end on the side of the valve stem 107, and a bottomed threaded bore 131 made smaller diameter than the fitting bore 130 and coaxially leading to the other end of the fitting bore 130. On the other hand, the valve stem 107 is provided with a fitted stem portion 107a to be fitted in the fitting bore 130, and an externally threaded portion 107b coaxially leading to the fitted stem portion 107a so that it can be screwed in the threaded bore 131. The externally threaded portion 107b has an axial length L1 set shorter than the axial length L2 of the fitting bore 130 (that is, L1<L2).

Moreover, the seal member 128 to contact elastically with the inner surface of the cylindrical portion 119a is mounted on the outer circumference of the diaphragm rod 124 at the portion corresponding to the outside of the threaded bore 131 made smaller diameter than the fitting bore 130, so that the diaphragm rod 124 can be made diametrally as small as possible.

Here, the diaphragm 93 is made such that the thickness of the joint portion, i.e., the central portion of the valve stem 107 and the thickness of the portion to be clamped between the body 34 and the cover 91, i.e., the circumferential edge portion are made relatively large, and such that the portion jointing the central portion and the circumferential edge portion is formed with a curved surface to have a relatively small thickness. According to this diaphragm 93, it is possible to improve the pressure resistance of the diaphragm 93 and the responsiveness at a cold time.

The second diaphragm retainer 120 is integrally provided at its outer circumferential side with a deflection regulating portion 120a for regulating the deflection of the diaphragm 93 toward the spring chamber 116. This deflection regulating portion 120a is formed of a curved-shape to bulge toward the spring chamber 116 so that its outer circumferential edge is positioned close to, and opposed to the inner face of the cover 91. Moreover, the diaphragm 93 is made thicker at a portion corresponding to the clearance between the outer edge of the deflection regulating portion 120a and the inner circumference of the cover 91 than that clearance.

In the outer end opening of the accommodation bore 118, i.e., in the threaded bore portion 118a, an adjust screw 132 is screwed so as to be movable back and forth. The coil spring 117 is interposed under compression between the adjust screw 132 and the abutment plate portion 123a of the piston 123 connected to the central portion of the diaphragm 93. By adjusting the moving position of the adjust screw 132, therefore, it is possible to adjust the spring load on the coil spring 117. Moreover, a recess 132a is formed in the inner end of the adjust screw 132 for receiving the entire end portion of the coil spring 117 on the side opposed to the diaphragm 93.

On the other hand, on the protrusion of the adjust screw 132 from the cover 91, there is screwed a lock nut 133. The adjust screw 132 is provided with an open bore 134 for venting the spring chamber 116 to the atmosphere.

Here, the piston 123 slides integrally with the diaphragm 93. On the outer surface of this piston 123, are a plurality of, e.g., a pair of ring members or O-rings 135 and 135 are mounted for elasticallty slidably contacting with the inner face of the cover 91 so that they are spaced in the axial direction of the piston 123. The space between the two O-rings 135 and 135 and between the outer face of the piston 123 and the cover 91 is filled up with grease 136. When the two O-rings 135 and 135 are mounted on the piston 123 from its one axial side, moreover, there is a possibility that one of the two O-rings 135 and 135 may be damaged by the O-ring grooves. On the outer face of the two axial ends of the piston 123, however, curved chamfered portions 123c and 123d are provided, so that the O-rings 135 and 135 can be easily mounted respectively on the piston 123 from its two axial end sides while being prevented from being damaged by the O-ring grooves. In order that the O-rings 135 and 135 may be prevented from being damaged when the piston 123 mounted with the O-rings 135 and 135 is to be inserted into the accommodation bore 118, on the other hand, this accommodation bore 118 is provided, at its one end opening, i.e., on the inner end opening on the side to fit the piston 123, with a taper chamfered portion 118c.

In order that the piston 123 and the diaphragm 93 in the spring chamber 116 may not be sealed up with the O-rings 135 and 135, the piston 123 is provided at its cylindrical portion 123b with a communication bore 129 extending between the inner and outer faces of the cylindrical portion 123b.

Further, in the body 34, a plurality of, e.g., four passages 137, ——, and 137 are arranged, which extend upward through the pressure-reducing chamber 94 and which are spaced around the mounting bore 97. Moreover, a plurality of, e.g., four ridges 138 are disposed protrudingly on the rising portion 96 of the body 34. The four ridges can contact with the first diaphragm retainer 119 at the central portion of the diaphragm 93 so as to regulate the deflection of the diaphragm 93 toward the pressure-reducing chamber 94 and which form grooves 139 inbetween. When the first diaphragm retainer 119 comes into contact with each of the ridges 138, the CNG having passed the valve hole 104 from the valve chamber 103 can flow toward the pressure-reducing chamber 94 through the grooves 101, which are formed in the end portion of the valve seat member 98 on the side of the pressure-reducing chamber 94, and through the grooves 139.

With no high-pressure CNG having flown into the valve chamber 103 in that primary pressure-reducing valve 37, the diaphragm 93 is deflected toward the pressure-reducing chamber 94 by the spring force of the coil spring 117, so that the valve member 106 leaves the valve seat 105 to open the valve hole 104. Thus, the high-pressure CNG having flown into the valve chamber 103 flows from the valve hole 104 toward the pressure-reducing chamber 94 so that the pressure in the pressure-reducing chamber 94 rises to such a level as to deflect the diaphragm 93 toward the spring chamber 116 against the spring force of the coil spring 117. Then, the valve member 106 is seated on the valve seat 105 to shut the valve hole 104. After these opening/shutting actions of the valve hole 104 are repeated, the CNG having flown at a high pressure of 250 to 10 Kg/cm$^2$ into the valve chamber 103 is reduced to 6 to 7 Kg/cm$^2$, for example, and it flows from the pressure-reducing chamber 94 to the respective passages 137, ——, and 137.

The body 34 is provided with the bottomed mounting bore 97 which is made coaxial with the valve stem 107 and opened toward the pressure-reducing chamber 94. The mounting bore 97 is screwed with the cylindrical valve seat member 98 which forms the valve chamber 103 for accommodating the valve member 106 between itself and the closed end of the mounting bore 97. The valve seat 105 facing the valve chamber 103 is formed on the inner face of the end portion of the valve seat member 98 on the side of the pressure-reducing chamber 94. Therefore, compared with the arrangement in which the valve seat is formed on the inner end of the accommodation bore formed in the body to accommodate the valve member and in which the cover member for sealing the outer end of the accommodation bore is mounted on the body, it is not necessary to mount the member such as the cover member and the like, and it is possible to reduce the number of parts and to increase the degree of freedom for arranging the primary pressure-reducing valve 37 on the body 34. Moreover, since the valve seat 105 is formed on the inner surface of the end portion of the valve seat member 98 on the side of the pressure-reducing chamber 94, the valve member 106 can be arranged as close to the pressure-reducing chamber 94 as possible to make a contribution to a size reduction of the body 34.

One end portion of the valve stem 107 is borne in the body 34 through the bearing 109. The plurality of guide portions 110 which come into sliding contact with the inner surface of the valve seat member 98 are formed on the outer surface of the valve member 106 at a plurality of circumferentially spaced portions. Between the respective guide portions 110 and between the valve member 106 and the valve seat member 98, the communication passages 111 which extend in the axial direction of the valve stem 107 are formed. As a result, one end portion of the valve stem 107 is borne in the body 34 so as to be movable in the axial direction, and the valve stem 107 is so borne at the portion, where the valve member 106 is fixed in the body 34 through the valve member 106 and the valve seat member 98 so as to be movable in the axial direction. Even if the transverse load by the coil spring 117 acts on the valve stem 107 or if the diaphragm 93 is misaligned, the valve stem 107 can be prevented from falling down to align the axis of the valve seat 105 and that of the valve member 106 accurately, so that the valve member 106 can be reliably seated along its entire circumference on the valve seat 105.

Here, the valve member 106 is made of a synthetic resin so that it grows harder to degrade its sealing performance as the ambient temperature drops. As a result, the lower the ambient temperature grows, the more prominent the deterioration in the pressure regulation accompanying the inclination of the valve member 106 with respect to the valve seat 105 appears. In the arrangement in which only one end side of the valve stem 107 is borne in the body 34, as shown by a broken line in FIG. 11, the deterioration in the pressure regulation is caused at a lower temperature by the inclination of the valve member so that the pressure reduction drops. In the aforementioned arrangement in which the valve stem 107 is borne at its one end portion and at the portion of the valve member 106 by the body 34 and the valve seat member 98, on the contrary, the valve member 106 can be properly seated on the valve seat 105 at all times without any inclination, as shown by a solid line in FIG. 11, so that a higher pressure reduction can be achieved while preventing the deterioration in the pressure regulation.

Moreover, the sliding resistance resulting from the arrangement that the respective guide portions 110 provided on the valve member 106 of the synthetic resin are in sliding contact with the inner face of the valve seat member 98 is established against the vibration of the coil spring 117 so that the self-excited vibration can be prevented to the utmost.

Further, the valve seat member 98 is screwed into the mounting bore 97. On the end surface of the valve seat member 98 on the side of the pressure-reducing chamber 94, a plurality of protrusions 102 are disposed protrudingly, which form the plurality of grooves 101 extending radially of the valve stem 107 in the plane normal to the axis of the valve stem 107. As a result, a tool can be engaged with the grooves 101 between the respective ridges 102 to turn the valve seat member 98 thereby to facilitate the mounting of the valve seat member 98 on the body 34.

The valve stem 107 is fastened to the diaphragm rod 124 which is fixed at the central portion of the diaphragm 93. The diaphragm rod 124 is provided with the fitting bore 130 and the bottomed threaded bore 131 coaxially leading to the fitting bore 130. The valve stem 107 is provided with the fitted stem portion 107a to be fitted in the fitting bore 130, and the externally threaded portion 107b coaxially leading to the fitted stem portion 107a and capable of being screwed in the threaded bore 131. The axial length L1 of the externally threaded portion 107b is set shorter than the axial length L2 of the fitting bore 130. At the start of screwing the externally threaded portion 107b into the threaded bore 131, therefore, the fitted stem portion 107a has already been partially fitted in the fitting bore 130. Therefore, even if chips are produced by screwing the externally threaded portion 107b into the threaded bore 131, they are confined between the valve stem 107 and the diaphragm rod 124 so that their removing works can be eliminated to improve the assembling efficiency.

The cover 91 is provided with the accommodation bore 118 which is opened at its outer end to insert/remove the coil spring 117 that it is arranged coaxially with the valve hole 104. The adjust screw 132 to be screwed into the outer end opening of the accommodation bore 118 is provided with the recess 132a for receiving the entire end portion of the coil spring 117 on the side opposed to the diaphragm 93. This makes it unnecessary for the coil spring 117 to be received by the retainer on the side opposed to the diaphragm 93, so that the number of parts can be reduced. Moreover, when the circumferential edge portion of the diaphragm 93 is clamped between the body 34 and the cover 91, the coil spring 117 can be removed from the cover 91, and the cover 91 can be fastened in the body 34 while avoiding the application of the offset load to the diaphragm 93. As a result, the diaphragm 93 can be prevented from being displaced, and the valve member 106 can be reliably seated on the valve seat 105 to prevent the deterioration in the pressure regulation. When the coil spring 117 is compressed by the adjust screw 132, on the other hand, the guide function of the end portion of the coil spring 117 is performed by the recess 132a of the adjust screw 132 so that the coil spring 117 can be prevented from being inclined.

Moreover, on the outer surface of the piston 123 to reciprocate in the axial direction of the valve stem 107 in response to the deflection of the diaphragm 93, the paired O-rings 135 and 135 are mounted, which come elastically into sliding contact with the inner surface of the cover 91, so that the sliding resistance to the self-excited vibration of the coil spring 117 can be achieved.

The sliding resistance could also be achieved by mounting only one O-ring 135 on the outer surface of the piston 123. When this single O-ring 135 is mounted, however, the hysteresis is exhibited by broken curves in FIG. 12. When the paired O-rings 135 and 135 are mounted, a larger hysteresis is exhibited, as shown by solid lines in FIG. 12. A larger sliding resistance to the self-excited vibrations of the coil spring 117 can be achieved by the paired O-rings 135 and 135.

Moreover, the space between the two O-rings 135 and 135 is filled up with the grease 136 so that their respective wears can be suppressed while avoiding the outflow of the grease 136 as much as possible even for a long operation. Even if the respective O-rings 135 and 135 are blotted with the oil component included in the air entered into the spring chamber 116 from the outside, the sliding resistance is set in the initial state considering the grease 136 so that no reduction in the sliding resistance is resulted in. Since the necessary sliding resistance is achieved by the paired O-rings 135 and 135, the respective O-rings 135 and 135 are not diametrally enlarged even if the compressibility considering the permanent strains of the respective O-rings 135 and 135 is set for a proper sliding resistance. Thus, it is possible to increase the degree of freedom for arranging the O-rings 135 and 135.

The piston 123 is slidably fitted in the cover 91 so as to be movable within the range restricted in the axial direction of the valve stem 107, and is connected to the central portion of the diaphragm 93. It enables the piston 123 to give such an aligning function as to align the direction of deflection of the diaphragm 93 to the axis of the valve hole 104. Specifically, the diaphragm 93 is subjected to the spring force in the direction to reduce the capacity of the pressure-reducing chamber 94 by the coil spring 117 having a relatively high spring force. When the coil spring 117 falls down, the deflection direction of the diaphragm 93, i.e., the axis of the valve stem 107 also falls down, and the seating of the valve member 106 on the valve seat 105 may become incomplete to cause the deterioration in the pressure regulation. Since the piston 123 is slidably fitted in the cover 91, it is possible to prevent the fall of the axis of the valve stem 107 and accordingly the deterioration in the pressure regulation.

Moreover, the piston 123 is provided with the communication bore 129 for providing the communication between the inside and outside of the piston 123, so that the back pressure of the diaphragm 93 can be prevented from being undesirably raised or lowered in response to the forward or backward movements of the diaphragm 93 and the piston 123.

Moreover, the deflection regulating portion 120a on the outer circumference of the second diaphragm retainer 120 to abut against or to be fixed on the central portion of the diaphragm 93 on the side of the spring chamber 116 is formed in a curved shape toward the spring chamber 116 so as to bring its outer circumferential edge close to the inner surface of the cover 91. Therefor, even when a pressure exceeding a predetermined level is applied to the pressure-reducing chamber 94, the diaphragm 93 can be smoothly curved, as indicated by chained lines in FIG. 8, from the second diaphragm retainer 120 to the inner surface of the cover 91. Thus, the durability of the diaphragm 93 can be improved by preventing the diaphragm 93 from being bent toward the spring chamber 116 at the outer edge of the second diaphragm retainer 120 and by preventing the lifetime of the diaphragm 93 from being shortened by the bent.

Secondary Pressure-Reducing Valve 38

Figure 13:
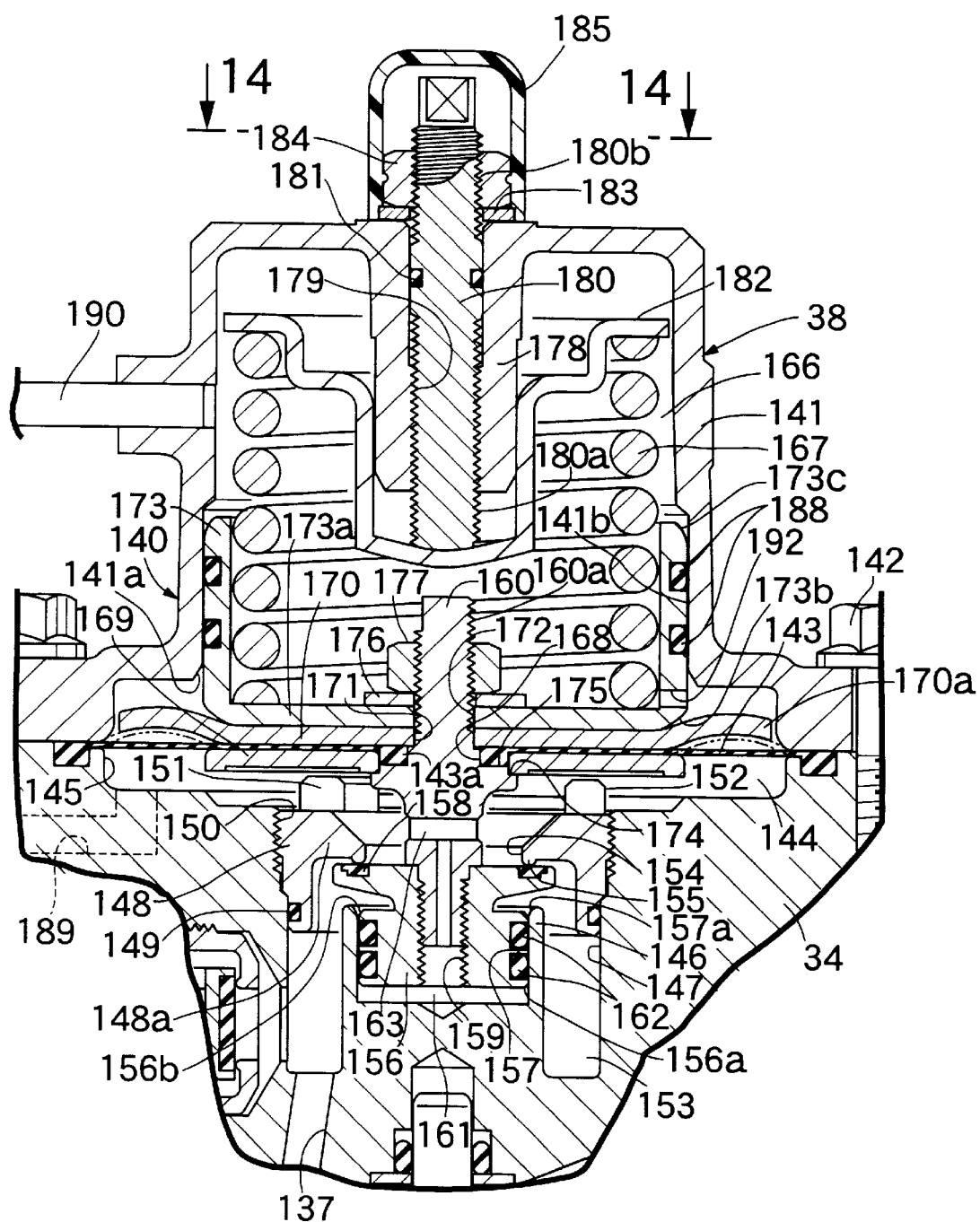

With additional reference to FIG. 13, the valve housing 140 of the secondary pressure-reducing valve 38 is constructed to include an upper portion of the body 34, and a cover 141 which is fastened by means of a plurality of bolts 142 on the upper surface of the flanged portion 77 included in the upper portion of the body 34. A diaphragm 143 is clamped at its circumferential edge portion between the upper surface of the body 34 and the cover 141.

A recess 145 for forming a pressure-reducing chamber 144 between the body 34 and the diaphragm 143 is formed on the upper surface of the body 34. The body 34 is provided at the central portion of the closed end of the recess 145 and closed at its lower end with a bottomed mounting bore 147 which is vertically extended and is opened at its upper end toward the pressure-reducing chamber 144. Moreover, the mounting bore 147 is provided at its closed inner end with a rising portion 146 which rises toward the pressure-reducing chamber 144.

An internal thread 150 in which a cylindrical valve seat member 148 is screwed is formed in the inner surface of the end portion of the mounting bore 147 on the side of the pressure-reducing chamber 144. An annular seal member 149 for elastically contacting with the inner face of the mounting bore 147 on the inner side of the internal thread 150 is mounted on the outer surface of this valve seat member 148.

Moreover, on the end surface of the valve seat member 148 on the side of the pressure-reducing chamber 114, there are formed a plurality of, e.g., four ridges 152 for forming inbetween a plurality of, e.g., four grooves 151 extending radially of the valve seat member 148 in a plane normal to the axis of the mounting bore 147. These grooves 151 are arranged in the shape of a cross. When the valve seat member 148 is to be fastened in the internal thread 150, the not-shown tool can be applied to the cross-shaped grooves 151 to turn the valve seat member 148 so that the valve seat member 148 can be easily mounted on the body 34.

Between the valve seat member 148 and the closed portion of the lower end of the mounting bore 147, a valve chamber 153 is formed a valve chamber 153, which has communication with the passages 137 and 137 for guiding the CNG from the primary pressure-reducing valve 37. The valve seat member 148 is integrally provided at its end portion on the side of the pressure-reducing chamber 144 with an inward flange 148a extending radially inward. In the inner circumference of this inward flange 148a, a valve hole 154 communicating with the pressure-reducing chamber 144 is formed. On the inner face of the inward flange 148a, there is formed an annular valve seat 155 facing the valve chamber 153 while opening the valve hole 154 in the central portion so that it protrudes toward the valve chamber 153.

In the rising portion 146, a bottomed sliding bore 157 opened toward the valve hole 154 is formed coaxially with the valve hole 154. A valve member 156 or a reciprocal member is slidably fitted in the sliding bore 157. Moreover, an annular rubber seal 158 which can be seated on the valve seat 155 is fixed on the valve member 156. The valve member 156 is coaxially provided with a threaded bore 159 which extends through the two axial ends of the valve member 156. A valve stem 160 which is made coaxially with the valve hole 154 is screwed at its one end in the threaded bore 159. In short, the valve member 156 is fixed at one end of the valve stem 160.

A back pressure chamber 161 is formed between the valve member 156 and the inner surface of the closed end of the sliding bore 157. On the outer surface of the valve member 156, there are mounted a plurality of, e.g., a pair of ring members or O-rings 162 and 162 to come into elastically sliding contact with the inner surface of the sliding bore 157 so that they are spaced in the axial direction of the valve member 156. The space between these two O-rings 162 and 162 and between the outer surface of the valve member 156 and the inner surface of the sliding bore 157 is filled up with the (not-shown) grease.

When the two O-rings 162 and 162 are mounted on the valve member 156 from its axial one side, moreover, one of the O-rings 162 and 162 may be damaged by the O-ring groove. On the outer surfaces of the two axial ends of the valve member 156, however, the curved chamfered portions 156a and 156b are formed so that the O-rings 162 and 162 can be respectively mounted easily on the valve member 156 from its two axial end sides while being prevented from being damaged by the O-ring grooves. In order the O-rings 162 and 162 may be prevented from any damage when the valve member 156 carrying them is to be inserted into the sliding bore 157, a taper chamfered portion 157a is formed on the one end opening of the sliding bore 157 on the side to fit the valve member 156, that is, on the inner end opening.

Between the cover 141 and the diaphragm 143, a spring chamber 166 is formed a spring chamber 166, in which a coil spring 167 for urging the diaphragm 143 toward the pressure-reducing chamber 144 is accommodated.

The diaphragm 143 is provided at its central portion with a through bore 168 and an annular seal portion 143a enclosing the through bore 168. A first diaphragm retainer 169 having a ring-plate shape enclosing the seal portion 143a is abutted against the surface of the diaphragm 143 on the side of the pressure-reducing chamber 144. A second diaphragm retainer 170 having a through hole 171 in a center portion while clamping the diaphragm 143 between itself and the first diaphragm retainer 169 is abutted against the surface of the central portion of the diaphragm 143 on the side of the spring chamber 166.

On the other hand, the spring chamber 166 at the portion of the cover 141 closer to the diaphragm 143 is provided with a sliding bore 141b for fitting a piston 173 acting as a cylindrical reciprocating member in a manner to allow it to slide in the axial direction within a restricted range. This piston 173 is provided at its end portion on the side of the diaphragm 143 with an abutment plate portion 173a of a ring-plate shape which has a through hole 172 corresponding to the through hole 171 to abut against the second diaphragm retainer 170.

The valve stem 160 having the valve member 156 fixed on its one end is extended coaxially through the valve hole 154 toward the spring chamber 166. The valve stem 160 is provided with an annular stepped portion 174 which is engaged with the inner circumference edge of the first diaphragm retainer 169 and an annular stepped portion 175 for clamping the seal portion 143a between itself and the second diaphragm retainer 170. A threaded stem portion 160a is formed at the other end portion of the valve stem 160 which protrudes through the through bores 168, 171 and 172 into the spring chamber 166. A nut 177 is screwed on the threaded stem portion 160a while interposing a washer 176 between itself and the second diaphragm retainer 170. By fastening the nut 177, the central portion of the diaphragm 143 is clamped between the two diaphragm retainers 169 and 170, and the valve stem 160 is connected to the central portion of the diaphragm 143. Moreover, a communication passage 163 is formed in the valve stem 160, the passages cause the pressure-reducing chamber 144 to communicate with the back pressure chamber 161.

The second diaphragm retainer 170 is integrally provided at its outer circumferential side with a deflection regulating portion 170a for regulating the deflection of the diaphragm 143 toward the spring chamber 166. This deflection regulating portion 170a is formed to bulge in a curved shape toward the spring chamber 166 so that its outer circumferential edge is positioned close to and opposed to the inner surface of the cover 141.

Here, the cover 141 is integrally provided at its outer end closed portion with a supporting cylindrical portion 178 which has two open ends and an internal thread 179 is formed in the inner face of its inner end portion. An adjust screw 180 is inserted into this supporting cylinder portion 178. External thread portion 180a included in the adjust screw 180 on its axially inner end is screwed in the internal thread 179 is protruded into the spring chamber 166. The adjust screw 180 is further provided at its axially outer side with an external thread portion 180b, which is protruded to the outside of the cover 141. Further, on the outer surface of the axially intermediate portion of the adjust screw 180, an annular seal member 181 is mounted, which elastically contacts with the inner surface of the supporting cylinder portion 178.

In the spring chamber 166, a retainer 182 is supported in abutment against the inner end of the adjust screw 180, and the coil spring 167 is interposed under compression between the retainer 182 and the abutment plate portion 173a of the piston 173 connected to the central portion of the diaphragm 143. Therefore, the spring load of the coil spring 167 can be adjusted by adjusting the moving position of the adjust screw 180.

On the protruded portion of the adjust screw 180 from the cover 141, i.e., on the external thread portion 180b, a nut 184 is screwed while interposing a washer 183 between itself and the cover 141. By loosening the nut 184, the moving position of the adjust screw 180 can be adjusted.

Figure 14:
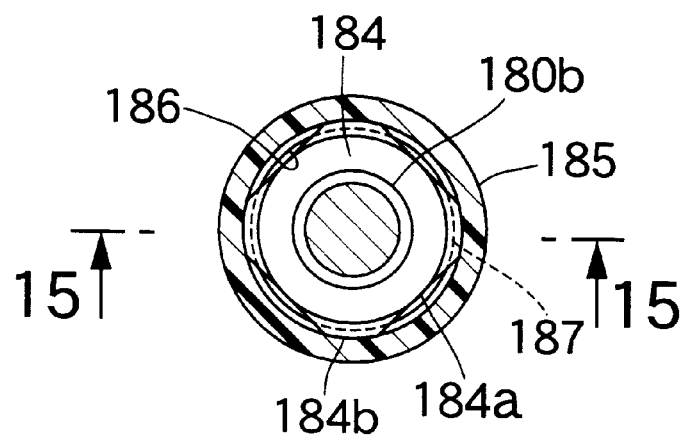
Figure 15:
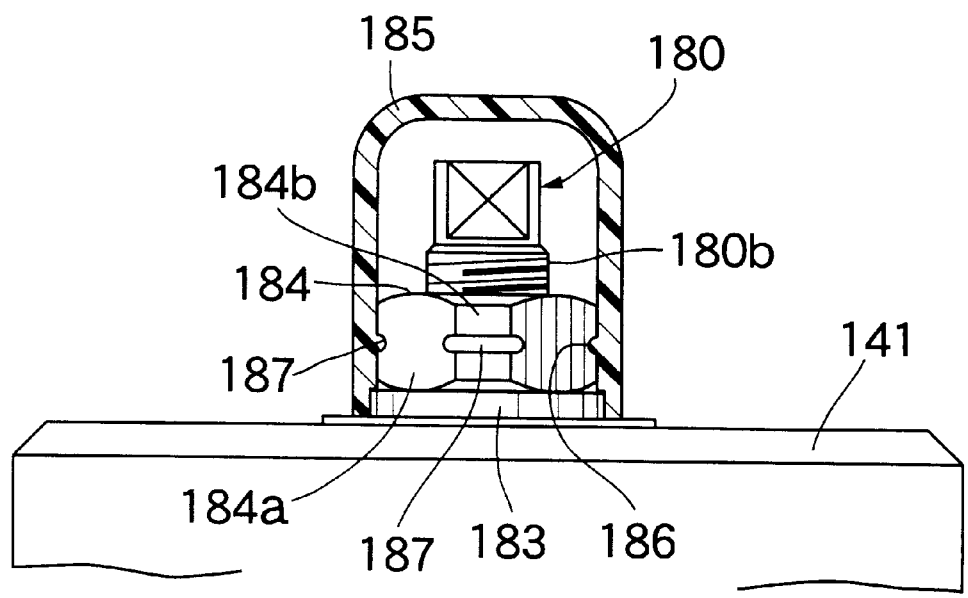

With additional reference to FIGS. 14 and 15, the outer end portion of the adjust screw 180 and the nut 184 are covered with a cap 185 made of a synthetic resin. Moreover, the nut 184 is provided with an outer periphery which is comprised of four flat faces 184a arranged in parallel with the axis of the adjust screw 180 and equidistantly in the peripheral direction, and four curved faces 184b joining those flat faces 184a. These respective curved surfaces 184b are provided with engagement grooves 187 for causing an annular engagement protrusion 186 projected from the inner surface of the cap 185.

Here, the piston 173 slides integrally with the diaphragm 143. On a plurality of, e.g., two axially spaced portions of the outer surface of this piston 173, there are mounted ring members or O-rings 188 and 188 for elastically slidably contacting with the inner surface of the cover 141. The space between the two O-rings 188 and 188 and between the outer surface of the piston 173 and the inner face of the cover 141 is filled up with the (not-shown) grease. Moreover, when the two O-rings 188 and 188 are mounted on the piston 173 from its one axial side, one of the two O-rings 188 and 188 may be damaged by the O-ring grooves. However, curved chamfered portions 173b and 173c are provided on the outer surface of the two axial ends of the piston 173, so that the O-rings 188 and 188 can be respectively mounted easily on the piston 173 from its two axial end sides while being prevented from being damaged by the O-ring grooves. In order that the O-rings 188 and 188 may be prevented from being damaged when the piston 173 carrying them is to be inserted into the cover 141, this cover 141 is provided, in its sliding bore 141b at its one end opening on the side to fit the piston 173, i.e., on the inner end opening on the side to fit the piston 173, with a taper chamfered portion 141a.

In order that the piston 173 and the diaphragm 143 in the spring chamber 166 may not be sealed up with the O-rings 188 and 188, the piston 173 is provided with a communication bore 192 extending between the inner and outer surfaces of the piston 173.

The body 34 is provided with a passage 189 leading to the pressure-reducing chamber 144. To the passage 189, there is connected the conduit 30 which leads to the injector 29 of the engine E. Moreover, a connection tube 190 is connected to the cover 141 so that the intake negative pressure of the engine E is introduced into the spring chamber 166 via the connection tube 190 and the (not-shown) conduit connected to the tube 190.

With no high-pressure CNG having flown into the valve chamber 153 in that secondary pressure-reducing valve 38, the diaphragm 143 is deflected toward the pressure-reducing chamber 144 by the spring force of the coil spring 167 so that the valve member 156 leaves the valve seat 155 to open the valve hole 154. Thus, the high-pressure CNG having flown into the valve chamber 153 flows from the valve hole 154 into the pressure-reducing chamber 144 so that the pressure difference between the pressure-reducing chamber 144 and the spring chamber 166 rises to such a level as to deflect the diaphragm 143 toward the spring chamber 166 against the spring force of the coil spring 167. Then, the valve member 156 is seated on the valve seat 155 to shut the valve hole 154. After these opening/shutting actions of the valve hole 154 are repeated, the CNG having flown at the pressure of 6 to 7 $Kg/cm^2$ into the valve chamber 153 is reduced to 2 to 3 $Kg/cm^2$, for example, until it is supplied from the pressure-reducing chamber 144 to the injector 29 via the passage 189 and the conduit 30.

The body 34 is provided with the bottomed mounting bore 147 which is made coaxial with the valve stem 160 and opened toward the pressure-reducing chamber 144. In the mounting bore 147, there is screwed the cylindrical valve seat member 148 which forms the valve chamber 153 for accommodating the valve member 156 between itself and the closed end of the mounting bore 147. The valve seat 155 facing the valve chamber 153 is formed on the inner surface of the end portion of the valve seat member 148 on the side of the pressure-reducing chamber 144. Unlike the arrangement in which the valve seat is formed on the inner end of the accommodation bore formed in the body to accommodate the valve member and in which the cover member for sealing the outer end of the accommodation bore is mounted on the body, it is unnecessary to mount members such as the cover member and the like, and it is possible to reduce the number of parts and to increase the degree of freedom for arranging the secondary pressure-reducing valve 38 on the body 34. Since the valve seat 155 is formed on the inner surface of the end portion of the valve seat member 148 on the side of the pressure-reducing chamber 144, the valve member 156 can be arranged as close to the pressure-reducing chamber 144 as possible to make a contribution to a size reduction of the body 34.

The valve seat member 148 is screwed into the mounting bore 147. On the end surface of the valve seat member 148 on the side of the pressure-reducing chamber 144, the plurality of protrusions 152 are disposed protrudingly, which form inbetween the grooves 151 extending in the radial direction of the valve stem 160 in the plane normal to the axis of the valve stem 160. As a result, a tool can be engaged with the grooves 151 between the respective ridges 152 to turn the valve seat member 148 thereby to facilitate the mounting of the valve seat member 148 on the body 34. Moreover, the deflection of the diaphragm 143 toward the pressure-reducing chamber 144 is regulated by abutting against the respective protrusions 152. Even with the diaphragm 143 abutting against the respective protrusions 152, the valve hole 154 and the pressure-reducing chamber 144 can be communicated with each other through the individual grooves 151.

Further, on the outer surface of the valve member 156 which reciprocates in the axial direction of the valve stem 160 in accordance with the deflection of the diaphragm 143, there are mounted a plurality of, e.g., a pair of O-rings 162 and 162 which come into elastically sliding contact with the body 34. On the outer surface of the piston 173 to reciprocate in the axial direction of the valve stem 160 in response to the deflection of the diaphragm 143, there are mounted the paired O-rings 188 and 188 which come elastically into sliding contact with the inner surface of the cover 141, so that a high sliding resistance to the self-excited vibration of the coil spring 167 can be achieved.

Moreover, the spaces between the O-rings 162 and 162 and the O-rings 188 and 188 are filled up with the grease so that their respective wears can be suppressed while avoiding the outflow of the grease as much as possible even for a long operation. Even if the respective O-rings 162 and 162 are blotted with the oil component which is carried by the CNG or if the O-rings 188 and 188 are blotted with the oil component which is carried by the air introduced into the spring chamber 166 from the outside, the sliding resistance is set in the initial state considering the grease so that no reduction in the sliding resistance is invited. Since the necessary sliding resistance is achieved by the paired O-rings: 162 and 162; and 188 and 188, moreover, the respective O-rings 162 and 188 is not diametrally enlarged even if the compressibility considering the permanent strains of the respective O-rings 162 and 188 is set for a proper sliding resistance. Thus, it is possible to increase the degree of freedom for arranging the O-rings: 162 and 162; and 188 and 188.

The piston 173 is slidably fitted in the cover 141 so as to be movable within the range restricted in the axial direction of the valve stem 160 and is connected to the central portion of the diaphragm 143. This can give the piston 173 the aligning function to align the direction of deflection of the diaphragm 143 to the axis of the valve hole 154. Specifically, the diaphragm 143 is subjected to the spring force in the direction to reduce the capacity of the pressure-reducing chamber 144 by the coil spring 167 having a relatively high spring force. When the coil spring 167 falls down, however, the deflection direction of the diaphragm 143, i.e., the axis of the valve stem 160 also falls down, and the seating of the valve member 156 on the valve seat 155 may become incomplete to cause the deterioration in the pressure regulation. Since the piston 173 is slidably fitted in the cover 141, however, it is possible to prevent the fall of the axis of the valve stem 160 and accordingly the deterioration in the pressure regulation.

Moreover, the piston 173 is provided with the communication bore 192 for providing the communication between the inside and outside of the piston 173, so that the back pressure of the diaphragm 143 can be prevented from being undesirably raised or lowered in response to the forward or backward movements of the diaphragm 143 and the piston 173.

Moreover, the deflection regulating portion 170a on the outer circumferential portion of the second diaphragm retainer 170 which is abutted against or to be fixed on the central portion of the diaphragm 143 on the side of the spring chamber 166 is formed to bulge in a curved shaped toward the spring chamber 166 so as to bring its outer circumferential edge close to the inner surface of the cover 141. When a pressure exceeding a predetermined level is applied to the pressure-reducing chamber 144, therefore, the diaphragm 143 can be smoothly curved, as indicated by chained lines in FIG. 13, from the second diaphragm retainer 170 to the inner face of the cover 141. Thus, the durability of the diaphragm 143 can be improved by preventing the diaphragm 143 from being bent toward the spring chamber 166 at the outer edge of the second diaphragm retainer 170 and by preventing the lifetime of the diaphragm 143 from being shortened by the bent.

Further, the nut 184 which is screwed on the outer end portion of the adjust screw 180 for fixing the moving position of the adjust screw 180, is provided with an outer periphery which is comprised of four flat faces 184a arranged in parallel with the axis of the adjust screw 180 and equidistantly in the peripheral direction, and four curved faces 184b joining those flat faces 184a. These respective curved faces 184b are provided with engagement grooves 187 for causing an annular engagement protrusion 186 projected from the inner face of the cap 185. Specifically, the cap 185 is mounted on the nut 184 so that it can be made small-sized. Moreover, the nut 184 has the outer periphery of four faces so that the number of steps of working it can be reduced. Since the respective curved faces 184b are respectively provided with the engagement grooves 187, moreover, these grooves 187 can be made the longer to achieve the more engagement with the engagement protrusion 186 of the cap 185 thereby to prevent the cap 185 from easily coming out.

Relief Valve 39

Figure 4:
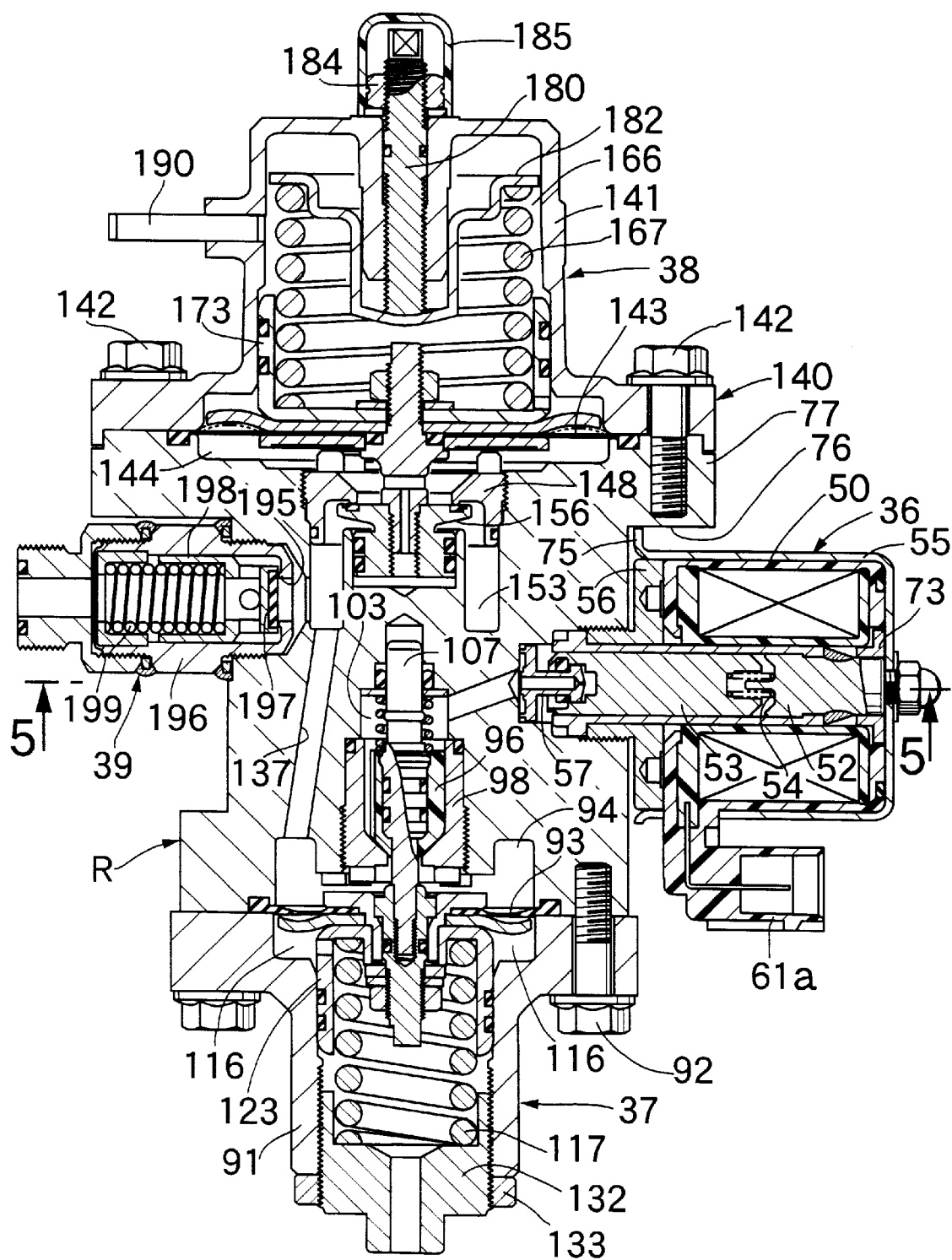

With especial reference to FIG. 4, the relief valve 39 is mounted on the side portion of the body 34 so that it is connected with one of the passages 137, ——, and 137 joining the primary pressure-reducing valve 37 and the secondary pressure-reducing valve 38. A valve member 198 having at its front end a rubber seal 197 for clogging the valve hole 195 and a spring 199 for urging the valve member 198 so as to seal the valve hole 195 with the rubber seal 197 are accommodated in a valve housing 196 to be fixed to the body 34 while having a valve hole 195 communicating with the passage 137. The valve housing 196 and the valve member 198 are formed to open the CNG from the passage 137 to the outside when the valve hole 195 is opened.

The relief valve 39 is opened to discharge the CNG to the atmosphere when the pressure in the passage 137 rises to exceed a valve opening level, which is determined by the spring 199, e.g., 16.5 Kg/cm$^2$.

Thermostat 40

With especial reference to FIG. 5, the body 34 is equipped with the warm water passage 33 so as to raise obstruction to the arrangement of the filter 35, the electromagnetic cut-off valve 36, the primary pressure-reducing valve 37, the secondary pressure-reducing valve 38 and the relief valve 39. A connection tube 201 leading to the entrance of the warm water passage 33 is attached to the body 34, and the thermostat 40 is mounted in the body 34 on the exit side of the warm water passage 33.

This thermostat 40 is given the arrangement well known in the art, in which a valve member 204 for opening/closing a valve hole 203 formed in the outer end of a housing 202 fixed in the body 34 is activated according to the extent of expansion of a wax 205 by the water temperature. When this water temperature exceeds 80 degrees, for example, the valve member 204 is activated to close the valve hole 203 by the wax 205 so that the temperature of the body 34 may be adjusted not to exceed 80 degrees.

Here, in the regulator R in which the filter 35, the electromagnetic cut-off valve 36, the primary pressure-reducing valve 37, the secondary pressure-reducing valve 38, the relief valve 39 and the thermostat 40 are arranged in the body 34, the primary pressure-reducing valve 37 and the secondary pressure-reducing valve 38 are mounted in the lower and upper portions of the body 34 so that their valve members 96 and 156 are coaxially aligned with each other, and the filter 35, the electromagnetic cut-off valve 36, the relief valve 39 and the thermostat 40 are arranged in the side portion of the body 34. As a result, the regulator R can be made as compact as possible. Moreover, the electromagnetic cut-off valve 36 and the relief valve 39 are arranged in the space which is established below the flanged portion 77 formed in the body 34 so as to fasten the cover 141 of the secondary pressure-reducing valve 38, so that a more contribution can be made to the size reduction of the regulator R.

Although the invention has been detailed in connection with its embodiment, it should not be limited thereto but could have a variety of design changes without departing from the gist thereof, as defined by Claims.

What is claimed is:

1. A gas pressure-reducing valve arrangement comprising a primary pressure-reducing valve and a secondary pressure-reducing valve, these valves being arranged in a common body and capable of reducing a gas pressure in a two-step manner, each of said primary and secondary pressure-reducing valves comprising a diaphragm having a peripheral edge portion between said body and a cover fastened to said body for constructing a valve housing together with said body, said diaphragm being spring-urged toward a side which reduces the capacity of a pressure-reducing chamber formed between said diaphragm and said body, in which a valve member that can be seated on a valve seat defining at a central portion an opened valve hole leading to said pressure-reducing chamber is fixed on a valve stem which is connected to the central portion of said diaphragm and arranged coaxially with said valve hole, wherein a bottomed mounting bore arranged coaxially with said valve stem and opened toward said pressure-reducing chamber is provided in said body, wherein a cylindrical valve seat member forming a valve chamber between itself and a closed end of said mounting bore for accommodating said valve member and inserted into said mounting bore is fixed on said body, wherein said valve seat facing said valve chamber is formed on an inner surface of an end portion of said valve seat member on the side of said pressure-reducing chamber, and wherein a passage for gas transfer between said primary and secondary reducing valves is formed in said body.

2. A gas pressure-reducing valve arrangement according to claim 1, wherein one end portion of said valve stem is borne on said body so as to be movable in the axial direction thereof, wherein a plurality of guide portions for coming into sliding contact with the inner surface of said valve seat member at a plurality of circumferentially spaced portions are provided on the outer surface of said valve member made of a synthetic resin, and wherein a passage extending in the axial direction of said valve stem is formed between said guide portions and between said valve member and said valve seat member.

3. A gas pressure-reducing valve arrangement according to claim 1, wherein an internal thread for fastening said valve seat member is formed in the inner surface of said mounting bore, and wherein a plurality of projections for forming therebetween a plurality of grooves extending radially of said valve stem in a plane normal to the axis of said valve stem are protruded from an end surface of said valve seat member that faces said pressure-reducing chamber.

4. A gas pressure-reducing valve arrangement according to claim 1, wherein on one of said valve housing and a reciprocating member slidably fitted in said valve housing so as to reciprocate in the axial direction of said valve hole in accordance with deflections of said diaphragm, a plurality of ring members are mounted to come into elastically sliding contact with the other of said reciprocating member and said valve housings so that said ring members are spaced from each other in the axial direction of said reciprocating member, and wherein a space defined between said ring members and between said reciprocating member and said valve housing is filled with grease.

5. A gas pressure-reducing valve arrangement according to claim 4, wherein a piston as said reciprocating member is slidably fitted in said cover so as to be movable within a restricted range in the axial direction of said valve hole and is connected to the central portion of said diaphragm.

6. A gas pressure-reducing valve arrangement according to claim 5, wherein said piston has a cylindrical shape and a communication bore is formed in said piston so as to extend over the inner and outer surfaces of said piston.

7. A gas pressure-reducing valve arrangement according to claim 4, wherein curved chamfered portions are formed on outer surfaces of axial opposite ends of said reciprocating member.

8. A gas pressure-reducing valve arrangement according to claim 4, wherein said reciprocating member is slidably fitted in a sliding bore formed in said valve housing from one end side of said sliding bore, and wherein a chamfered portion is formed on an opening at said one end side of said sliding bore.

9. A gas pressure-reducing valve arrangement according to claim 1, wherein said primary and secondary pressure-reducing valves are disposed in a mutually opposed relationship in said body.

10. A gas pressure-reducing valve arrangement according to claim 9, wherein said valve stems of the primary and secondary pressure-reducing valves are disposed coaxially with each other.

11. A gas pressure-reducing valve arrangement according to claim 1, further comprising a filter for filtering a gas to be supplied to said primary and secondary pressure-reducing valves, wherein said filter is mounted on said body at a location between said primary and secondary pressure-reducing valves.

12. A gas pressure-reducing valve arrangement according to claim 11, further comprising an electromagnetic cut-off valve for controlling supply and cut-off of said gas to the primary and secondary pressure-reducing valves, wherein said electromagnetic cut-off valve is mounted on said body at a location vertically corresponding to said filter.

13. A gas pressure-reducing valve arrangement according to claim 1, further comprising a filter for filtering a gas to be supplied to said primary and secondary pressure-reducing valves, an electromagnetic cut-off valve for controlling supply and cut-off of said gas to the primary and secondary pressure-reducing valves, a relief valve for controlling the pressure level of the gas treated in the valve arrangement, and a thermostat for controlling the temperature of said body, wherein said filter, said electromagnetic cut-off valve, said relief valve and said thermostat are mounted on said body.

* * * * *